US009396739B2

(12) United States Patent
Xu

(10) Patent No.: US 9,396,739 B2
(45) Date of Patent: Jul. 19, 2016

(54) METHOD AND APPARATUS FOR DETECTING VOICE SIGNAL

(71) Applicant: HUAWEI TECHNOLOGIES CO., LTD., Shenzhen (CN)

(72) Inventor: Lijing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/747,731

(22) Filed: Jun. 23, 2015

(65) Prior Publication Data

US 2015/0325256 A1 Nov. 12, 2015

Related U.S. Application Data

(63) Continuation of application No. PCT/CN2013/089983, filed on Dec. 19, 2013.

(30) Foreign Application Priority Data

Dec. 27, 2012 (CN) .......................... 2012 1 0580541

(51) Int. Cl.
*G10L 15/00* (2013.01)
*G10L 25/78* (2013.01)
(Continued)

(52) U.S. Cl.
CPC ................. *G10L 25/78* (2013.01); *G10L 25/93* (2013.01); *G10L 19/005* (2013.01); *G10L 25/87* (2013.01); *G10L 25/90* (2013.01)

(58) Field of Classification Search
USPC .................................. 704/200–232, 500–504
See application file for complete search history.

(56) References Cited

U.S. PATENT DOCUMENTS 5,774,847 A 6/1998 Chu et al.
6,125,265 A 9/2000 Yamamoto et al.
(Continued)

FOREIGN PATENT DOCUMENTS

CN 1209032 2/1999
CN 1322347 11/2001
(Continued)

OTHER PUBLICATIONS

International Search Report mailed on Mar. 27, 2014 in corresponding International Patent Application No. PCT/CN2013/089983.
(Continued)

*Primary Examiner* — Jesse Pullias
(74) *Attorney, Agent, or Firm* — Staas & Halsey LLP

(57) ABSTRACT

The invention discloses a method including: performing in a unit of first timeframe frame length, framing on a continuous voice sample to obtain a plurality of first timeframes, detecting energy of each of the first timeframes, and determining a target first timeframe including a potential abrupt exception of a voice signal by analyzing a relationship between the energy of the plurality of first timeframes; performing, in a unit of second timeframe frame length, framing on the continuous voice sample to obtain a plurality of second timeframes, and processing each of the second timeframes to acquire a tone feature, and determining, by analyzing a tone feature of at least one of the second timeframes including at least one target second timeframe, whether the potential abrupt exception of a voice signal included in the target first timeframe included in the target second timeframe is a real abrupt exception of a voice signal.

22 Claims, 9 Drawing Sheets

(51) Int. Cl.

| | |
|---|---|
| ***G10L 25/93*** | (2013.01) |
| *G10L 25/90* | (2013.01) |
| *G10L 25/87* | (2013.01) |
| *G10L 19/005* | (2013.01) |

(56) References Cited

U.S. PATENT DOCUMENTS

| | | | | |
|---|---|---|---|---|
| 2002/0062209 | A1 | 5/2002 | Choi | |
| 2002/0111798 | A1* | 8/2002 | Huang | G10L 19/22 704/220 |
| 2005/0027531 | A1 | 2/2005 | Gleason et al. | |
| 2005/0273326 | A1 | 12/2005 | Padhi et al. | |

FOREIGN PATENT DOCUMENTS

| | | | |
|---|---|---|---|
| CN | 1577489 | | 2/2005 |
| CN | 101131817 | | 2/2008 |
| EP | 0 880 256 | A2 | 11/1998 |
| WO | 91/05333 | | 4/1991 |
| WO | 01/22401 | A1 | 3/2001 |
| WO | 02/47068 | A2 | 6/2002 |

OTHER PUBLICATIONS

PCT International Search Report dated Mar. 27, 2014 in corresponding International Patent Application No. PCT/CN2013/089983.

Extended European Search Report dated Aug. 18, 2015 in corresponding European Patent Application No. 13867161.5.

"Information technology—Coding of moving pictures and associated audio for digital storage media at up to about 1,5 Mbit/s—Part 3: Audio", Technical Corrigendum 1, Apr. 15, 1996, 159 pp.

Search Report, dated Feb. 23, 2016, in corresponding Chinese Application No. 201210580417 (2 pp.).

Office Action, dated Mar. 4, 2016, in corresponding Chinese Application No. 20121058041.7 (3 pp.).

* cited by examiner

METHOD AND APPARATUS FOR DETECTING VOICE SIGNAL

CROSS REFERENCE

This application is a continuation of International Application No. PCT/CN2013/089983, filed on Dec. 19, 2013, which claims priority to Chinese Patent Application No. 201210580541.7, filed on Dec. 27, 2012, both of which are hereby incorporated by reference in their entireties.

TECHNICAL FIELD

The present invention relates to the audio processing field, and more specifically, to a method and an apparatus for detecting a voice signal.

BACKGROUND

In audio technologies, for ease of analysis, abrupt start (abrupt start) and/or abrupt stop (abrupt stop) of a voice signal in this specification indicate/indicates two types of situations: One situation is that abrupt stop and abrupt start occur in a pair in a same section of a voice segment and last for a relatively short time, and is referred to as abrupt interruption for short in the context. For example, in a talking process, a loss of a part of information in the middle of a segment of voice signals may cause abrupt interruption. The other situation is that abrupt start occurs alone or abrupt stop occurs alone, and is referred to as abrupt start or abrupt stop for short in the context. For example, abrupt start of a voice signal occurs when talking starts or abrupt stop of a voice signal occurs when talking stops. In the following, an abrupt exception of a voice signal may include one of abrupt interruption, abrupt start, and abrupt stop of a voice signal.

The abrupt exception of a voice signal is mainly caused by a packet loss and VAD erroneous determination in a signal processing process and may cause damage to semantics (semantic) and syntax (syntactic) of the voice signal after the voice signal is restored. Because the semantics and the syntax are relevant to language content (language content), compared with a non-native language examinee, a native language examinee is affected more greatly by abrupt start or abrupt stop of a voice signal. When an existing voice quality assessment model is used to assess quality of a voice signal, generally, language content is not analyzed, and therefore, an impact of the abrupt exception of a voice signal on acoustic quality cannot be reflected. To address this problem, in addition to a basic assessment model, it is required that an abrupt exception of a voice signal can be detected, so that quality assessment is performed on an individual abrupt exception of a voice signal that occurs in all voice signals.

In the prior art, accuracy in detecting an abrupt exception of a voice signal is relatively low.

SUMMARY

In view of this, embodiments of the present invention provide a method and an apparatus for detecting a voice signal, so that a problem that accuracy in detecting an abrupt exception of a voice signal is relatively low can be resolved.

According to a first aspect, a method for detecting a voice signal is provided, including: performing, in a unit of first timeframe frame length, framing on a continuous voice sample to obtain a plurality of first timeframes, detecting energy of each of the first timeframes, and determining a target first timeframe including a potential abrupt exception of a voice signal by analyzing a relationship between the energy of the plurality of first timeframes, where the potential abrupt exception of a voice signal includes one of potential abrupt interruption, abrupt start, and abrupt stop of a voice signal; performing, in a unit of second timeframe frame length, framing on the continuous voice sample to obtain a plurality of second timeframes, where a frame length of each of the second timeframes is an integral multiple of the first timeframe frame length, and a second timeframe including the target first timeframe is a target second timeframe; and processing each of the second timeframes to acquire a tone feature, and determining, by analyzing a tone feature of at least one of the second timeframes including at least one of the target second timeframe, whether the potential abrupt exception of a voice signal included in the target first timeframe included in the target second timeframe is a real abrupt exception of a voice signal.

In a first possible implementation manner, the method includes: performing framing on the continuous voice sample in a unit of first timeframe frame length, to divide the continuous voice sample into the plurality of first timeframes according to a chronological order, and acquiring energy frame_energy_short(i) of each of the first timeframes, where the $i^{th}$ frame is the $i^{th}$ first timeframe in the plurality of first timeframes, and i is a natural number.

With reference to the first possible implementation manner of the first aspect, in a second possible implementation manner, the method includes: if the relationship between the energy of the first timeframes meets (frame_energy_short(i−1)−frame_energy_short(i)≥$a_2$) and (frame_energy_short(i)<$a_1$), determining that the $i^{th}$ frame is a target first timeframe including potential abrupt stop of a voice signal, where $a_1$ and $a_2$ are a preset first threshold and a preset second threshold, respectively, and i≥1.

With reference to the first possible implementation manner of the first aspect, in a third possible implementation manner, the method includes: if the relationship between the energy of the first timeframes meets (frame_energy_short(i−2)−frame_energy_short(i)≥$a_2$) and (frame_energy_short(i)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt stop of a voice signal, determining that the $i^{th}$ frame is the target first timeframe including potential abrupt stop of a voice signal, where i≥2 and the $0^{th}$ frame and the $1^{st}$ frame are preset as first timeframes not including potential abrupt stop of a voice signal.

With reference to the first possible implementation manner of the first aspect, in a fourth possible implementation manner, the method includes: if the relationship between the energy of the first timeframes meets (frame_energy_short(i−3)−frame_energy_short(i)≥$a_2$) and (frame_energy_short(i)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt stop, determining that the $i^{th}$ frame is the target first timeframe including potential abrupt stop of a voice signal, where i≥3 and the $0^{th}$ frame, the $1^{st}$ frame, and the $2^{nd}$ frame are preset as first timeframes not including potential abrupt stop of a voice signal.

With reference to the first possible implementation manner of the first aspect, in a fifth possible implementation manner, the method includes: if the relationship between the energy of the first timeframes meets (frame_energy_short(i)−frame_energy_short(i−1)≥$a_2$) and (frame_energy_short(i−1)<$a_1$), determining that the $i^{th}$ frame is a target first timeframe including potential abrupt start of a voice signal, where $a_1$ and $a_2$ are a preset first threshold and a preset second threshold, respectively, and i≥1.

With reference to the first possible implementation manner of the first aspect, in a sixth possible implementation manner, the method includes: if the relationship between the energy of the first timeframes meets (frame_energy_short(i)−frame_energy_short(i−2)≥$a_2$) and (frame_energy_short(i−2)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt start of a voice signal, determining that the $i^{th}$ frame is the target first timeframe including potential abrupt start of a voice signal, where i≥2 and the $0^{th}$ frame and the $1^{st}$ frame are preset as first timeframes not including potential abrupt start of a voice signal.

With reference to the first possible implementation manner of the first aspect, in a seventh possible implementation manner, the method includes: if the relationship between the energy of the first timeframes meets (frame_energy_short(i)−frame_energy_short(i−3)≥$a_2$) and (frame_energy_short(i−3)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt start of a voice signal, determining that the $i^{th}$ i frame is the target first timeframe including potential abrupt start of a voice signal, where i≥3 and the $0^{th}$ frame, the $1^{st}$ frame, and the $2^{nd}$ frame are preset as first timeframes not including potential abrupt start of a voice signal.

With reference to the first aspect or any one of the foregoing possible implementation manners of the first aspect, in an eighth possible implementation manner, the method includes: performing tone detection processing on the plurality of second timeframes according to a chronological order; and acquiring a total sound pressure level spl_total(k), a tonal component sound pressure level spl_tonal(k), and a non-tonal component sound pressure level spl_non_tonal(k) of the $k^{th}$ frame as tone features of the $k^{th}$ frame, where the $k^{th}$ frame is the $k^{th}$ second timeframe in the plurality of second timeframes and k is a natural number.

With reference to the eighth possible implementation manner of the first aspect, in a ninth possible implementation manner, the method includes: if a tone feature of the target second timeframe meets spl_tonal(k)≥$a_3$, determining that the potential abrupt exception of a voice signal included in the $k^{th}$ frame is real abrupt interruption of a voice signal; or if a tone feature of the target second timeframe meets ($a_4$≤spl_tonal(k)<$a_3$) and (spl_total(k)>=$a_5$), determining that the potential abrupt exception of a voice signal included in the $k^{th}$ frame is real abrupt interruption of a voice signal, where $a_3$, $a_4$, and $a_5$ are a preset third threshold, a preset fourth threshold, and a preset fifth threshold, respectively.

With reference to the eighth possible implementation manner of the first aspect, in a tenth possible implementation manner, the method includes: determining whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets: (spl_tonal(k+1)≥$a_7$), (spl_tonal(k)<$a_8$), (spl_tonal(k+1)−sp_non_tonal(k)>0), and (spl_non_tonal(k−1)<$a_9$), determining that the potential abrupt exception of a voice signal included in the $k^{th}$ frame is real abrupt start of a voice signal; or determining whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets: (spl_tonal(k+2)≥$a_{10}$), (spl_tonal(k+1)<$a_{11}$), (spl_tonal(k+2)−sp_non_tonal(k+1)>0), and (spl_non_tonal(k)<$a_{12}$), determining that the potential abrupt exception of a voice signal included in the $k^{th}$ frame is real abrupt start of a voice signal, where $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k)−spl_total(k−1)≥$a_6$) and (spl_total(k−1) and spl_total(k−2) grow gently), determining that spl_tonal(k) grows excessively rapidly, where k≥2, and it is preset that a total sound pressure level of the $0^{th}$ frame and a total sound pressure level of the $1^{st}$ frame grow gently; or if the tone feature of the second timeframe meets (spl_total(k)−spl_total(k−2)≥$a_6$), (spl_total(k)>spl_total(k−1)), (spl_total(k−1)>spl_total(k−2)≥$a_6$), and (spl_total(k−1) and spl_total(k−2) grow gently), determining that spl_tonal(k) grows excessively rapidly, where k≥2, it is preset that a total sound pressure level of the $0^{th}$ frame and a total sound pressure level of the $1^{st}$ frame grow gently, and $a_6$ is a preset sixth threshold; or if the tone feature of the second timeframe meets neither of the foregoing two conditions, determining that spl_tonal(k) grows gently.

With reference to the eighth possible implementation manner of the first aspect, in an eleventh possible implementation manner, the method includes: determining whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets: (spl_tonal(k−1)≥$a_7$), (spl_tonal(k)<$a_8$), (spl_tonal(k−1)−sp_non_tonal(k)>0), and (spl_non_tonal(k+1)<$a_9$), determining that the potential abrupt exception of a voice signal included in the $k^{th}$ frame is real abrupt stop of a voice signal, where k≥1; or determining whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets: (spl_tonal(k−2)≥$a_{10}$), (spl_tonal(k−1)<$a_{11}$), (spl_tonal(k−1)−sp_non_tonal(k−2)>0), and (spl_non_tonal(k)<$a_{12}$), determining that the potential abrupt exception of a voice signal included in the $k^{th}$ frame is real abrupt stop of a voice signal, where k≥2, and $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k−1)−spl_total(k)≥$a_6$) and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if the tone feature of the second timeframe meets (spl_total(k−2)−spl_total(k)≥$a_6$), (spl_total(k−1)>spl_total(k)), and (spl_total(k−2)>spl_total(k−1)), and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if neither of the foregoing two conditions is met, determining that spl_total(k) decreases gently, where $a_6$ is a preset sixth threshold.

According to a second aspect, an apparatus for detecting a voice signal is provided, including a first detecting unit, a framing unit, and a second detecting unit, where the first detecting unit is configured to: perform, in a unit of first timeframe frame length, framing on a continuous voice sample to obtain a plurality of first timeframes, detect energy of each of the first timeframes, and determine a target first timeframe including a potential abrupt exception of a voice signal by analyzing a relationship between the energy of the plurality of first timeframes, where the potential abrupt exception of a voice signal includes one of potential abrupt interruption, abrupt start, and abrupt stop of a voice signal; the framing unit is configured to perform, in a unit of second timeframe frame length, framing on the continuous voice sample to obtain a plurality of second timeframes, where each second timeframe frame length is an integral multiple of the first timeframe frame length, and a second timeframe including the target first timeframe is a target second timeframe; and the second detecting unit is configured to: process each of the second timeframes to acquire a tone feature, and determine, by analyzing a tone feature of at least one of the second timeframes including at least one target second timeframe, whether the potential abrupt exception of a voice signal included in the target first timeframe included in the target second timeframe is a real abrupt exception of a voice signal.

In a first possible implementation manner, the first detecting unit includes a first acquiring module and a first determining module, where the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; and the first determining module is configured to: if the relationship between the energy of the first timeframes meets (frame_energy_short(i−1)−frame_energy_short(i)≥$a_2$) and (frame_energy_short(i)<$a_1$), determine that the $i^{th}$ frame is a target first timeframe including potential abrupt stop of a voice signal, where $a_1$ and $a_2$ are a preset first threshold and a preset second threshold, respectively, and i≥1.

With reference to the second aspect, in a second possible implementation manner, the first detecting unit includes a first acquiring module and a first determining module, where the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; where the first determining module is configured to: if the relationship between the energy of the first timeframes meets (frame_energy_short(i−2)−frame_energy_short(i)≥$a_2$) and (frame_energy_short(i)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt stop of a voice signal, determine that the $i^{th}$ frame is the target first timeframe including potential abrupt stop of a voice signal, where i≥2 and the $0^{th}$ frame and the $1^{st}$ frame are preset as first timeframes not including potential abrupt stop of a voice signal.

With reference to the second aspect, in a third possible implementation manner, the first detecting unit includes a first acquiring module and a first determining module, where the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; where the first determining module is configured to: if the relationship between the energy of the first timeframes meets (frame_energy_short(i−3)−frame_energy_short(i)≥$a_2$) and (frame_energy_short(i)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt stop, determine that the $i^{th}$ frame is the target first timeframe including potential abrupt stop of a voice signal, where i≥3 and the $0^{th}$ frame, the $1^{st}$ frame, and the $2^{nd}$ frame are preset as first timeframes not including potential abrupt stop of a voice signal.

With reference to the second aspect, in a fourth possible implementation manner, the first detecting unit includes a first acquiring module and a first determining module, where the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; and the first determining module is configured to: if the relationship between the energy of the first timeframes meets (frame_energy_short(i)−frame_energy_short(i−1)≥$a_2$) and (frame_energy_short(i−1)<$a_1$), determine that the $i^{th}$ frame is a target first timeframe including potential abrupt start of a voice signal, where $a_1$ and $a_2$ are a preset first threshold and a preset second threshold, respectively, and i≥1.

With reference to the second aspect, in a fifth possible implementation manner, the first detecting unit includes a first acquiring module and a first determining module, where the first acquiring module is configured to perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; and the first determining module is configured to: if the relationship between the energy of the first timeframes meets (frame_energy_short(i)−frame_energy_short(i−2)≥$a_2$) and (frame_energy_short(i−2)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt start of a voice signal, determine that the $i^{th}$ frame is the target first timeframe including potential abrupt start of a voice signal, where i≥2 and the $0^{th}$ frame and the $1^{st}$ frame are preset as first timeframes not including potential abrupt start of a voice signal.

With reference to the second aspect, in a sixth possible implementation manner, the first detecting unit includes a first acquiring module and a first determining module, where the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; and the first determining module is configured to: if the relationship between the energy of the first timeframes meets (frame_energy_short(i)−frame_energy_short(i−3)≥$a_2$) and (frame_energy_short(i−3)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt start of a voice signal, determine that the $i^{th}$ frame is the target first timeframe including potential abrupt start of a voice signal, where i≥3 and the $0^{th}$ frame, the $1^{st}$ frame, and the $2^{nd}$ frame are preset as first timeframes not including potential abrupt start of a voice signal.

With reference to the second aspect or any one of the foregoing possible implementation manners of the second aspect, in a seventh possible implementation manner, the second detecting unit includes a second acquiring module and a second determining module, where the second acquiring module is configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, where the $k^{th}$ frame is the $k^{th}$ second timeframe in the plurality of second timeframes and k is a natural number; and the second determining module is configured to: if a tone feature of the target second timeframe meets spl_tonal(k)≥$a_3$, determine that the potential abrupt exception of a voice signal included in the $k^{th}$ frame is real abrupt interruption of a voice signal; or if a tone feature of the target second timeframe meets ($a_4$≤spl_tonal(k)<$a_1$) and (spl_ total(k)>=$a_5$), determine that the potential abrupt exception of a voice signal included in the $k^{th}$ frame is real abrupt interruption of a voice signal, where $a_3$, $a_4$, and $a_5$ are a preset third threshold, a preset fourth threshold, and a preset fifth threshold, respectively.

With reference to the second aspect or any one of the foregoing possible implementation manners of the second aspect, in an eighth possible implementation manner, the second detecting unit includes a second acquiring module and a second determining module, where the second acquiring module is configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, where the $k^{th}$ frame is the $k^{th}$ second timeframe in the plurality of second timeframes and k is a natural number; and the second determining module is configured to: determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+1)≥$a_7$),
(spl_tonal(k)<$a_8$),
(spl_tonal(k+1)−sp_non_tonal(k)>0), and
(spl_non_tonal(k−1)<$a_9$), determine that the potential abrupt exception of a voice signal included in the $k^{th}$ frame is real abrupt start of a voice signal; or determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+2)≥$a_{10}$),
(spl_tonal(k+1)<$a_{11}$),
(spl_tonal(k+2)−sp_non_tonal(k+1)>0), and
(spl_non_tonal(k)<$a_{12}$), determine that the potential abrupt exception of a voice signal included in the $k^{th}$ frame is real abrupt start of a voice signal, where $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k)−spl_total(k−1)≥$a_6$) and (spl_total(k−1) and spl_total(k−2) grow gently), determining that spl_tonal(k) grows excessively rapidly, where k>2, and it is preset that a total sound pressure level of the $0^{th}$ frame and a total sound pressure level of the $1^{st}$ frame grow gently; or if the tone feature of the second timeframe meets (spl_total(k)−spl_total(k−2)≥$a_6$), (spl_total(k)>spl_total(k−1)), (spl_total(k−1)>spl_total(k−2)), and (spl_total(k−1) and spl_total(k−2) grow gently), determining that spl_tonal(k) grows excessively rapidly, where k≥2, it is preset that a total sound pressure level of the $0^{th}$ frame and a total sound pressure level of the $1^{st}$ frame grow gently, and $a_6$ is a preset sixth threshold; or if the tone feature of the second timeframe meets neither of the foregoing two conditions, determining that spl_tonal(k) grows gently.

With reference to the second aspect or any one of the possible implementation manners of the second aspect, in a ninth possible implementation manner, the second detecting unit includes a second acquiring module and a second determining module, where the second acquiring module is configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, where the $k^{th}$ frame is the $k^{th}$ second timeframe in the plurality of second timeframes and k is a natural number; and the second determining module is configured to: determine whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

(spl_tonal(k−1)≥$a_7$),
(spl_tonal(k)<$a_8$),
(spl_tonal(k−1)−sp_non_tonal(k)>0), and
(spl_non_tonal(k+1)<$a_9$), determine that the potential abrupt exception of a voice signal included in the $k^{th}$ frame is real abrupt stop of a voice signal, where k≥1; or determine whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

(spl_tonal(k−2)≥$a_{10}$),
(spl_tonal(k−1)<$a_{11}$),
(spl_tonal(k−1)−sp_non_tonal(k−2)>0), and
(spl_non_tonal(k)<$a_{12}$), determine that the potential abrupt exception of a voice signal included in the $k^{th}$ frame is real abrupt stop of a voice signal, where k≥2, and $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k−1) spl_total(k)≥$a_6$) and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if the tone feature of the second timeframe meets (spl_total(k−2)−spl_total(k)≥$a_6$), (spl_total(k−1)>spl_total(k)), (spl_total(k−2)>spl_total(k−1)), and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if neither of the foregoing two conditions is met, determining that spl_total(k) decreases gently, where $a_6$ is a preset sixth threshold.

According to the foregoing technical solution, a real abrupt exception of a voice signal can be determined by first detecting a potential abrupt exception of a voice signal and further analyzing a tone feature of the potential abrupt exception of a voice signal, so that accuracy in detecting an abrupt exception of a voice signal is effectively improved.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings not including creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention not including creative efforts shall fall within the protection scope of the present invention.

Figure 1A:
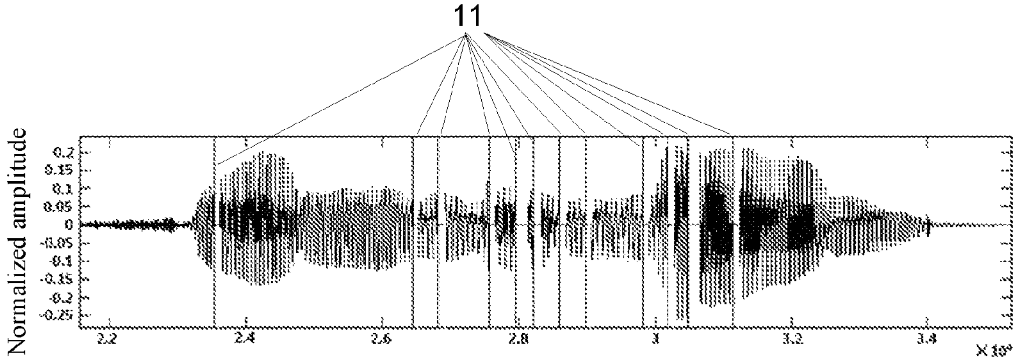
FIG. 1A and FIG. 1B are schematic screenshots of detection results of detecting an abrupt exception of a voice signal in related technologies.
Figure 1B:
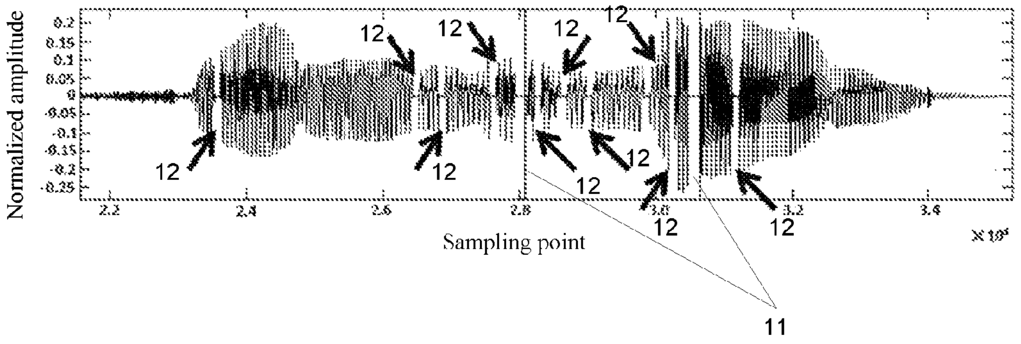

FIG. 1A and FIG. 1B are schematic screenshots of detection results of detecting an abrupt exception of a voice signal in related technologies. FIG. 1A shows a detection result manually demarcated by means of comparison with original voice and FIG. 1B is a detection result in the prior art. In FIG. 1A and FIG. 1B, a horizontal axis represents sampling points and a vertical axis represents normalized amplitude. For abrupt interruption occurring in a same segment of voice signals and lasting for a relatively short time, for ease of displaying, only locations of abrupt stop are marked in FIG. 1A and FIG. 1B, as indicated by line segments 11 in the figures. Compared with the manually demarcated detection result, in FIG. 1B, most abrupt interruption, which lasts for a short time and is indicated by arrows 12 in the figure, of a voice signal is not detected.

Figure 2A:
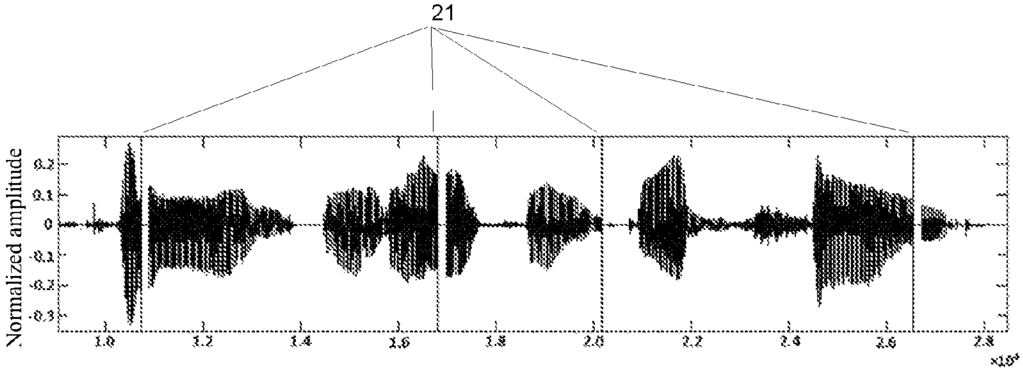
FIG. 2A and FIG. 2B are schematic screenshots of detection results of detecting an abrupt exception of a voice signal in related technologies.
Figure 2B:
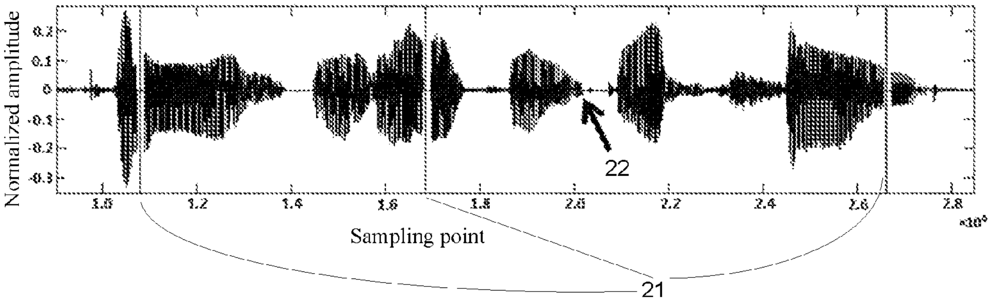

FIG. 2A and FIG. 2B are schematic screenshots of detection results of detecting an abrupt exception of a voice signal in related technologies. FIG. 2A shows a detection result manually demarcated by means of comparison with original voice and FIG. 2B shows a detection result in the prior art. In FIG. 2A and FIG. 2B, a horizontal axis represents sampling points and a vertical axis represents normalized amplitude. For abrupt interruption occurring in a same segment of voice signals and lasting for a relatively short time, for ease of displaying, only locations of abrupt stop are marked in FIG. 2A and FIG. 2B, and in addition, abrupt start or abrupt stop that occurs alone is also marked, as indicated by line segments 21 in the figures. Compared with the manually demarcated detection result, in FIG. 2B, abrupt start or abrupt stop, which is indicated by arrows 22 in the figure, of a voice signal with relatively low energy is not detected.

To resolve a problem, in the related technology, that accuracy in detecting an abrupt exception of a voice signal is relatively low, the embodiments of the present invention provide a method for detecting a voice signal, where abrupt exception of a voice signal may be detected based on analysis of a tone feature, so that accuracy in detecting the abrupt exception of a voice signal is effectively improved.

Figure 3:
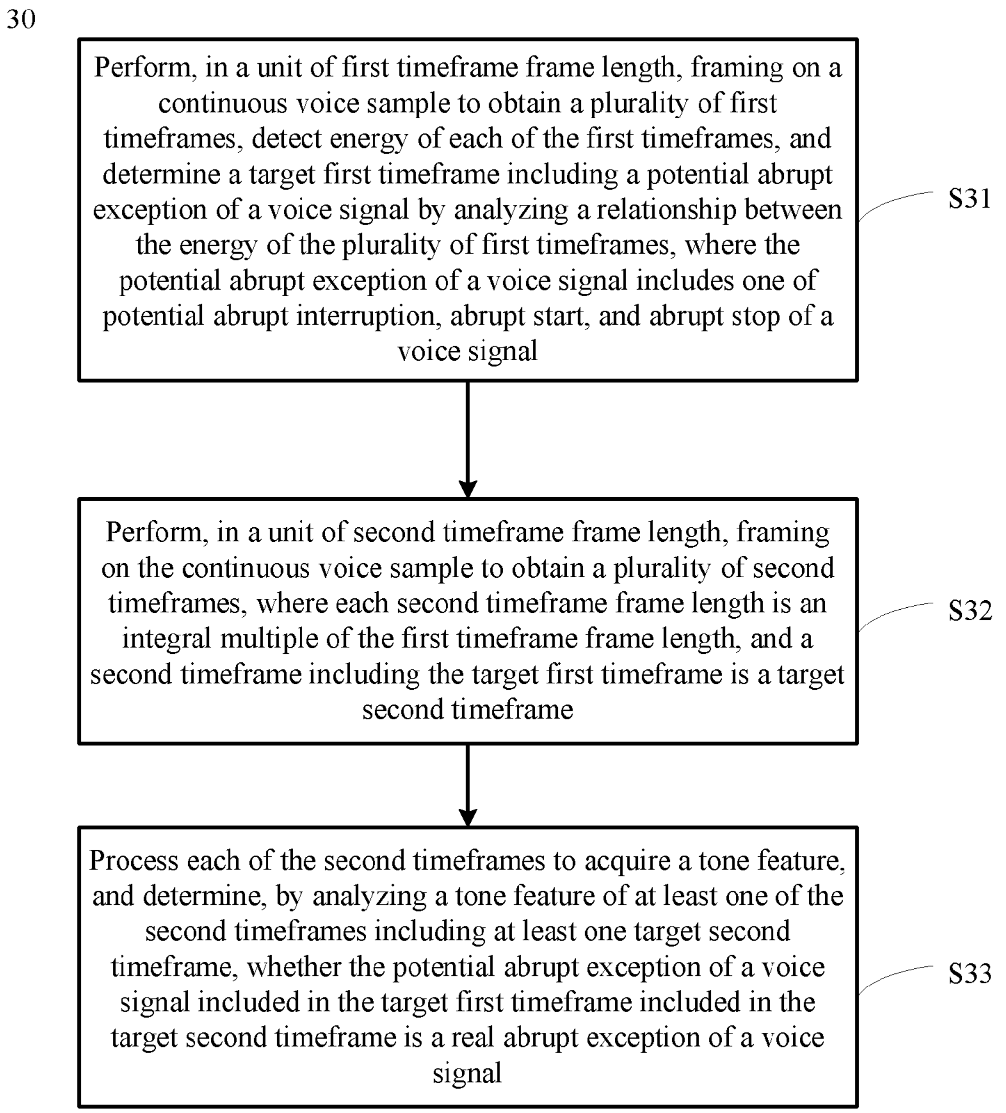
FIG. 3 is a schematic flowchart of a method for detecting an abrupt exception of a voice signal according to an embodiment of the present invention.

FIG. 3 is a schematic flowchart of a method 30 for detecting an abrupt exception of a voice signal according to an embodiment of the present invention. The method 30 includes the following content:

S31. Perform, in a unit of first timeframe frame length, framing on a continuous voice sample to obtain a plurality of first timeframes, detect energy of each of the first timeframes, and determine a target first timeframe including a potential abrupt exception of a voice signal by analyzing a relationship between the energy of the plurality of first timeframes, where the potential abrupt exception of a voice signal includes one of potential abrupt interruption, abrupt start, and abrupt stop of a voice signal.

As mentioned above, an abrupt exception of a voice signal may include one of abrupt interruption, abrupt start, and abrupt stop of a voice signal. A first timeframe including a potential abrupt exception of a voice signal may be determined by comparing the energy of the plurality of first timeframes and comparing the energy of a specific first timeframe and a preset threshold and the like. The first timeframe including a potential abrupt exception of a voice signal is also referred to as a target first timeframe in the context.

S32. Perform, in a unit of second timeframe frame length, framing on the continuous voice sample to obtain a plurality of second timeframes, where a frame length of each of the second timeframes is an integral multiple of the first timeframe frame length, and a second timeframe including the target first timeframe is a target second timeframe.

S33. Process each of the second timeframes to acquire a tone feature, and determine, by analyzing a tone feature of at least one of the second timeframes including at least one of the target second timeframe, whether the potential abrupt exception of a voice signal included in the target first timeframe included in the target second timeframe is a real abrupt exception of a voice signal.

An abrupt exception of a voice signal is also referred to as an abrupt exception for short in this specification, a potential abrupt exception of a voice signal is also referred to as a potential abrupt exception for short, and abrupt start of a voice signal or abrupt stop of a voice signal is also referred to as abrupt start or abrupt stop respectively for short. Abrupt interruption is abrupt stop and abrupt start that occur in pair in a same section of a voice segment and last for a relatively short time. Abrupt start or abrupt stop is that abrupt start occurs alone or that abrupt stop occurs alone, respectively.

When the second timeframe frame length is an integral multiple of the first timeframe, after framing is performed on the continuous voice sample in a unit of second timeframe frame length, one or more second timeframes are obtained. One second timeframe may include a plurality of first timeframes. However, in all second timeframes, one or some second timeframes may include separately one target first timeframe. This type of second timeframe is an object for detailed detection and analysis in this embodiment of the present invention and is also herein referred to as a target second timeframe. As an existing technology, to eliminate a boundary effect during voice signal processing, two neighboring second timeframes may partially overlap. For example, if a first second timeframe is from the $0^{th}$ sampling point to the $511^{st}$ sampling point, a second second timeframe is from the $255^{th}$ sampling point to the $767^{th}$ sampling point. Next, tone feature processing including fast-Fourier transform and the like is performed on each of all the second timeframes, and next, it is analyzed whether one or more second timeframes meet a predetermined relationship, so that it can be determined whether a potential abrupt exception of a voice signal included in a target second timeframe in the one or more second timeframes is a real abrupt exception of a voice signal, where it is known that the determined target second timeframe includes one target first timeframe.

This embodiment of the present invention provides a method for detecting a voice signal, where a real abrupt exception of a voice signal can be determined by first detecting a potential abrupt exception of a voice signal and further analyzing a tone feature of the potential abrupt exception of a voice signal, so that accuracy in detecting an abrupt exception of a voice signal is effectively improved.

Figure 4:
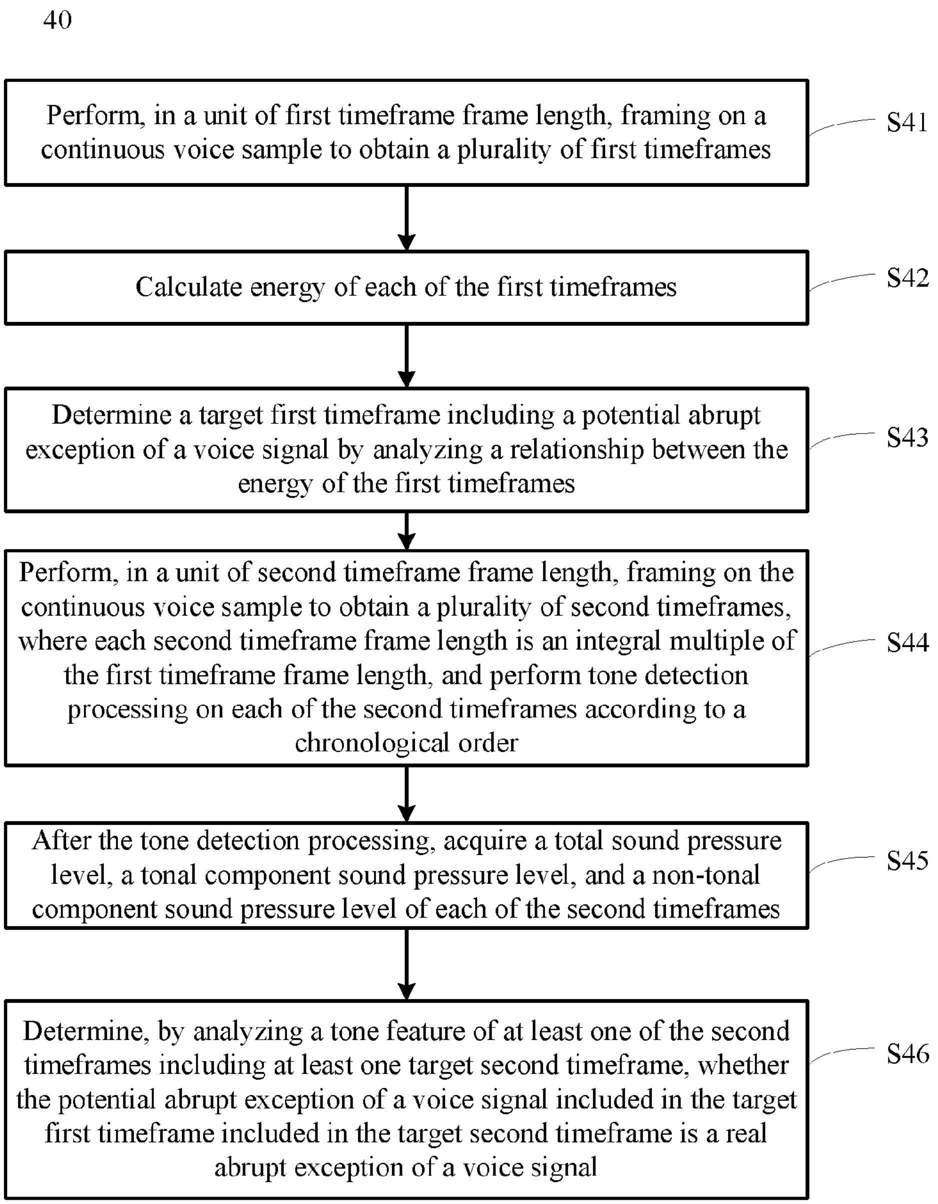
FIG. 4 is a schematic flowchart of a method for detecting an abrupt exception of a voice signal according to another embodiment of the present invention.

FIG. 4 is a schematic flowchart of a method 40 for detecting an abrupt exception of a voice signal according to another embodiment of the present invention. The method 40 includes the following content:

S41. Perform, in a unit of first timeframe frame length, framing on a continuous voice sample to obtain a plurality of first timeframes.

Framing is performed on a segment of a continuous voice sample in a unit of first timeframe frame length to obtain a plurality of continuous first timeframes. The $i^{th}$ frame in the plurality of first timeframes is referred to as the $i^{th}$ first timeframe and is referred to as the $i^{th}$ frame for short in the following.

S42. Calculate energy of each of the first timeframes.

Suppose that frame_energy_short(i) $i^{th}$ represents energy of the $i^{th}$ frame, where i is a natural number:

$$\text{frame\_energy\_short}(i) = 10 * lg \sum_{n=0}^{N_1-1} \text{time\_signal\_short}^2(n) \quad \text{Formula 1}$$

where time_signal_short(n) represents an input signal in the $i^{th}$ frame, n represents sampling points, $N_1$ represents the first timeframe frame length, and 32 sampling points are set in this embodiment. By selecting a first timeframe of an appropriate frame length, accuracy of detection can be improved or a relationship between accuracy of detection and complexity of an algorithm can be balanced.

S43. Determine a target first timeframe including a potential abrupt exception of a voice signal by analyzing a relationship between the energy of the first timeframes. Step S43 may include step S43-1 or step S43-2.

Energy of several frames previous to the $i^{th}$ frame and energy of the $i^{th}$ frame are detected, where the $(i-1)^{th}$ frame is a frame previous to the $i^{th}$ frame, the $(i-2)^{th}$ frame is a frame previous to the $(i-1)^{th}$ frame, and the $(i-3)^{th}$ frame is a frame previous to the $(i-2)^{th}$ frame, and so on.

S43-1. If the energy of the $i^{th}$ frame decreases rapidly, that is, if one of the following conditions is met, determine that the $i^{th}$ frame is a target first timeframe including potential abrupt stop of a voice signal.

a) (frame_energy_short(i−1)−frame_energy_short(i)≥$a_2$) and (frame_energy_short(i)<$a_1$).

Generally, it is preset that the $0^{th}$ frame is not a target first timeframe including potential abrupt stop. When i≥1, it can be determined, according to condition a), whether the $i^{th}$ frame is the target first timeframe including potential abrupt stop.

b) (frame_energy_short(i−2)−frame_energy_short(i)≥$a_2$) and (frame_energy_short(i)<$a_1$) and neither the $(i-1)^{th}$ frame nor the $(i-2)^{th}$ frame is a target first timeframe including potential abrupt stop, where i≥2 and the $0^{th}$ frame and the $1^{st}$ frame are preset as first timeframes not including potential abrupt stop of a voice signal.

For example, when i=2, the $0^{th}$ frame and the $1^{st}$ frame are already preset as first timeframes not including potential abrupt stop, and then it may be determined whether the $2^{nd}$ frame is a target first timeframe including potential abrupt stop of a voice signal, and so on.

c) (frame_energy_short(i−3)−frame_energy_short(i)≥$a_2$) and (frame_energy_short(i)<$a_1$) and none of the $(i-1)^{th}$ frame to the $(i-3)^{th}$ frame is a target first timeframe including potential abrupt stop, where i≥3 and the $0^{th}$ frame, the $1^{st}$ frame, and the $2^{nd}$ frame are preset as first timeframes not including potential abrupt stop of a voice signal.

For example, when i=3, the $0^{th}$ frame, the $1^{st}$ frame, and the $2^{nd}$ frame are already preset as first timeframes not including potential abrupt stop, and then it may be determined whether the $3^{rd}$ frame is a target first timeframe including potential abrupt stop of a voice signal, and so on.

In actual application, a continuous voice sample is relatively long and is generally processed in a chronological order, and some previous first timeframes may be preset as first timeframes not including potential abrupt stop according to one of the foregoing methods. Because each frame lasts for only tens of milliseconds in actual application, omission of detection results of several initial frames does not affect accuracy of voice detection.

S43-2. Compare the energy of the several frames previous to the $i^{th}$ frame and the energy of the $i^{th}$ frame. If the energy of the $i^{th}$ frame grows rapidly, that is, one of the following conditions is met, determine that the $i^{th}$ frame is a target first timeframe including potential abrupt start of a voice signal.

d) (frame_energy_short(i)−frame_energy_short(i−1)≥$a_2$) and (frame_energy_short(i−1)<$a_1$), where i≥1.

Generally, it is preset that the $0^{th}$ frame is not a target first timeframe including potential abrupt start. When i≥1, it may be determined, according to the condition d), whether the 1st frame is the target first timeframe including potential abrupt start.

e) (frame_energy_short(i)−frame_energy_short(i−2)≥$a_2$) and (frame_energy_short(i−2)<$a_1$) and neither the (i−1)th frame nor the (i−2)th frame is a target first timeframe including potential abrupt start, where i≥2 and the 0th frame and the 1st frame are preset as first timeframes not including potential abrupt start of a voice signal.

For example, when i=2, whether the 0th frame and the 1st frame have been preset as first timeframes not including potential abrupt start is already preset, and then it may be determined whether the 2nd frame is a target first timeframe including potential abrupt start of a voice signal, and so on.

f) (frame_energy_short(i)−frame_energy_short(i−3)≥$a_2$) and (frame_energy_short(i−3)<$a_1$) and none of the (i−1)th frame to the (i−3)th frame is a target first timeframe including potential abrupt start, where i≥3 and the 0th frame, the 1st frame, and the 2nd frame are preset as first timeframes not including potential abrupt start of a voice signal.

For example, when i=3, the 0th frame, the 1st frame, and the 2nd frame are already preset as first timeframes not including potential abrupt start, and then it may be determined whether the 3rd frame is a target first timeframe including potential abrupt start of a voice signal, and so on.

In actual application, a continuous voice sample is relatively long and is generally processed in a chronological order, and some previous first timeframes may be preset as first timeframes not including potential abrupt start according to one of the foregoing methods. Because each frame lasts for only tens of milliseconds in actual application, omission of detection results of several initial frames does not affect accuracy of voice detection.

In this embodiment of the present invention, $a_1$=38 and $a_2$=40. $A_1$ and $a_2$, $a_3$ to $a_{12}$ in the following embodiments, and the like are all preset thresholds in the conditions and generally need to be determined based on consideration regarding many aspects. For example, the thresholds are obtained by training a large quantity of samples according to a type of a test sequence. In addition, the thresholds are relevant to sound volume of the test sequence.

In the conditions b, c, e, and f, whether the several frames previous to the ith frame are a potential abrupt exception is a known condition.

The foregoing process in S41 to S43 is rough detection, and next, detailed detection is performed in S44 to S46.

S44. Perform, in a unit of second timeframe frame length, framing on the continuous voice sample to obtain a plurality of second timeframes, where each second timeframe frame length is an integral multiple of the first timeframe frame length, and perform tone detection processing on each of the second timeframes according to a chronological order.

In actual application, a processed continuous voice sample is relatively long, and generally a plurality of potential abrupt may be detected. It is known from the above that one second timeframe includes a plurality of first timeframe, and the second timeframe is longer than the first timeframe. Therefore, the second timeframe is also used to indicate a long timeframe, and the first timeframe is also used to indicate a short timeframe.

Framing is performed on the continuous voice sample in a unit of second timeframe frame length to obtain one or more second timeframes, where some second timeframes include the target first timeframes determined by means of rough detection, the target first timeframes include a potential abrupt exception of a voice signal, and these second timeframes are also referred to as target second timeframes. The kth frame in the plurality of second timeframes is referred to as the kth second timeframe and is referred to as the kth frame for short in the following. The (k−2)th frame, the (k−1)th frame, the kth frame, the (k+1)th frame, and the (k+2)th frame are a plurality of second timeframes arranged in order.

A step of the tone detection processing includes: performing FFT conversion on each of the second timeframes to acquire a power density spectrum; determining a local maximum point according to the power density spectrum; and analyzing a segment of a frequency domain range centered on the local maximum point, to determine whether a tonal component exists in a frequency band in which the local maximum point is located. In this step, a tone detection algorithm in the MPEG (Moving Pictures Experts Group, Moving Pictures Experts Group) psychoacoustic model 1 is used. For detailed descriptions, reference may be made to step 1 and step 4 in the ISO/IEC (the International Organization for Standardization and the International Electrotechnical Commission) 11173-3 and Annex D.1 (Psychoacoustic model 1) (psychoacoustic model 1).

In this embodiment of the present invention, what is special is that not only a total sound pressure level, that is, a feature, of a current frame is analyzed, but also a tonal component and a non-tonal component of the current frame is separately analyzed. Next, the tonal component and the non-tonal component are used for calculating another two tone features: a tonal component sound pressure level and a non-tonal component sound pressure level, respectively. A distribution situation of a tonal component and a non-tonal component of each of the second timeframes in a frequency domain may be learned by detecting the tonal component, and then a tonal component sound pressure level and a non-tonal component sound pressure level can be calculated.

The subsequent steps in this embodiment of the present invention are used to further determine whether a potential abrupt exception of a voice signal is a real abrupt exception of a voice signal. For example, although the (k−1)th frame may not include a first timeframe including a potential abrupt exception of a voice signal, the (k−1)th frame is a neighboring second timeframe of the kth frame, and therefore, a total sound pressure level, a tonal component sound pressure level, and a non-tonal component sound pressure level of the (k−1)th frame need to be calculated, so as to be applied to one or more determining conditions in the following, thereby determining whether potential abrupt exception of a voice signal included in a target first timeframe included in the kth frame is a real abrupt exception of a voice signal.

S45. After the tone detection processing, acquire a total sound pressure level, a tonal component sound pressure level, and a non-tonal component sound pressure level of each of the second timeframes.

S45-1. Acquire a total sound pressure level of the kth frame according to the following Formula 2.

Suppose that spl_total(k) represents the total sound pressure level of the kth frame:

$$\text{spl\_total}(k) = 10 * lg\left(\sum_{f=0}^{N_2/2-1} 10^{\frac{pow\_spec(f)}{10}}\right)\text{dB} \quad \text{Formula 2}$$

where pow_spec(f) represents a power density spectrum of the kth second timeframe, f=0,1,2, . . . , ($N_2$/2−1), and $N_2$ indicates the second timeframe length, and 512 sampling points are set in this embodiment. The sound pressure level is corresponding to sound strength, where greater sound strength is naturally corresponding to more energy. Therefore, the sound pressure level can reflect an energy situation. In this embodiment of the present invention, the feature, that is, the total sound pressure level, is used to reflect total energy of the second timeframe.

S45-2. Acquire a tonal component sound pressure level according to the following Formula 3.

Suppose that spl_tonal(k) represents a tonal component sound pressure level of the $k^{th}$ frame:

$$\text{spl\_tonal}(k) = 10 * lg\left(\sum_{n=0}^{N_k-1}\left(10^{\frac{pow\_spec(f\_tonal(n)-1)}{10}} + 10^{\frac{pow\_spec(f\_tonal(n))}{10}} + 10^{\frac{pow\_spec(f\_tonal(n)+1)}{10}}\right)\right)\text{dB} \quad \text{Formula 3}$$

where $N_k$ represents a quantity of tonal components detected in the current frame, and locations of the tonal components are marked as {f_tonal(0), f_tonal(1), f_tonal(2), . . . , f_tonal($N_k$)}.

The feature, that is, the tonal component sound pressure level, is used to describe an energy situation of a tonal component in the second timeframe. If spl_tonal(k) is relatively large, it indicates that the $k^{th}$ frame is located in an area with relatively rich tonal components.

S45-3. Acquire a non-tonal component sound pressure level according to the following Formula 4.

Suppose that spl_non_tonal(k) represents a non-tonal component sound pressure level of the $k^{th}$ frame:

$$\text{spl\_non\_tonal}(k) = 10 * lg\left(\sum_{f \notin \Phi_{tonal}} 10^{\frac{pow\_spec(f)}{10}}\right)\text{dB} \quad \text{Formula 4}$$

where $\Phi_{tonal}$ represents locations of a tonal component and a neighboring component of the tonal component in a frequency domain:

$$\Phi_{tonal}=\{f\_tonal(0)-1, f\_tonal(0), f\_tonal(0)+1, f\_tonal(1)-1, f\_tonal(1), f\_tonal(1)+1, f\_tonal(2)-1, f\_tonal(2), f\_tonal(2)+1, \ldots, f\_tonal(N_k)-1, f\_tonal(N_k), f\_tonal(N_k)+1\} \quad \text{Formula 5}$$

The feature, that is, the non-tonal component sound pressure level, is used to describe an energy situation of a non-tonal component in the second timeframe. If spl_non_tonal(k) is relatively large, it indicates that the $k^{th}$ frame is located in an area with relatively rich non-tonal components.

In this embodiment of the present invention, energy situation analysis is particularly performed on a tonal component and a non-tonal component of each of the second timeframes, which is different from the prior art. The analysis facilitates determining whether the potential abrupt exception of a voice signal included in the second timeframe is a real abrupt exception of a voice signal in the following.

S46. Determine, by analyzing a tone feature of at least one of the second timeframes including at least one target second timeframe, whether the potential abrupt exception of a voice signal included in the target first timeframe included in the target second timeframe is a real abrupt exception of a voice signal.

A determining method includes S46-1 or S46-2. In S46-1, real abrupt interruption of a voice signal may be determined, and in S46-2, real abrupt start or abrupt stop of a voice signal may be determined S46-1 and S46-2 are separately described as follows:

S46-1. If the tonal component sound pressure level of the $k^{th}$ frame meets either of the following condition g and condition h, determine that the potential abrupt exception included in the target first timeframe included in the $k^{th}$ frame is real abrupt interruption.

g) spl_tonal(k) is large enough, as expressed in the following formula:

$$\text{spl\_tonal}(k) \geq a_3 \quad \text{Formula 6}$$

h) spl_tonal(k) is relatively large and spl_total(k) is large enough, as expressed in the following formula:

$$(a_4 \leq \text{spl\_tonal}(k) < a_3) \text{ and } (\text{spl\_total}(k) >= a_5) \quad \text{Formula 7}$$

In this embodiment of the present invention, $a_3=55$, $a_4=30$, and $a_5=58$.

According to the condition g or the condition h, it may be sequentially determined whether a potential abrupt exception included in the target first timeframe included in each target second timeframe is real abrupt interruption.

If spl_tonal(k) and spl_total(k) meet the foregoing conditions, it indicates that the $k^{th}$ frame is located in an area with relatively rich tonal components. In a normal situation, it is impossible to find short-time sudden change of energy in rough detection performed on an area with relatively rich tonal components. If interruption of a voice signal can be detected in rough detection, it indicates that the detected interruption is real abrupt interruption.

Figure 5A:
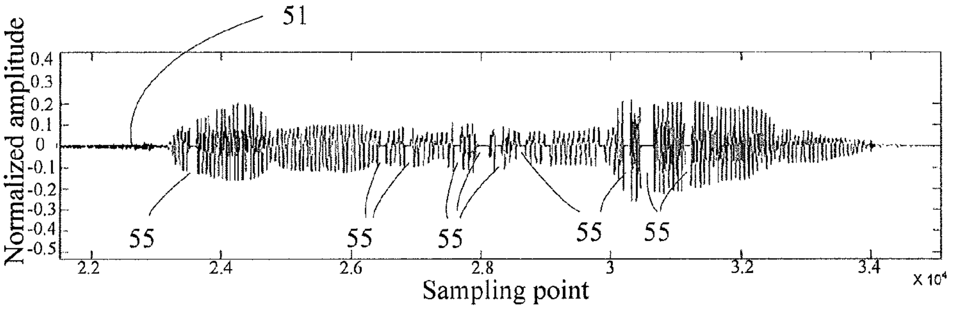
FIG. 5A and FIG. 5B are schematic diagrams of distribution curves of sound pressure levels according to another embodiment of the present invention.
Figure 5B:
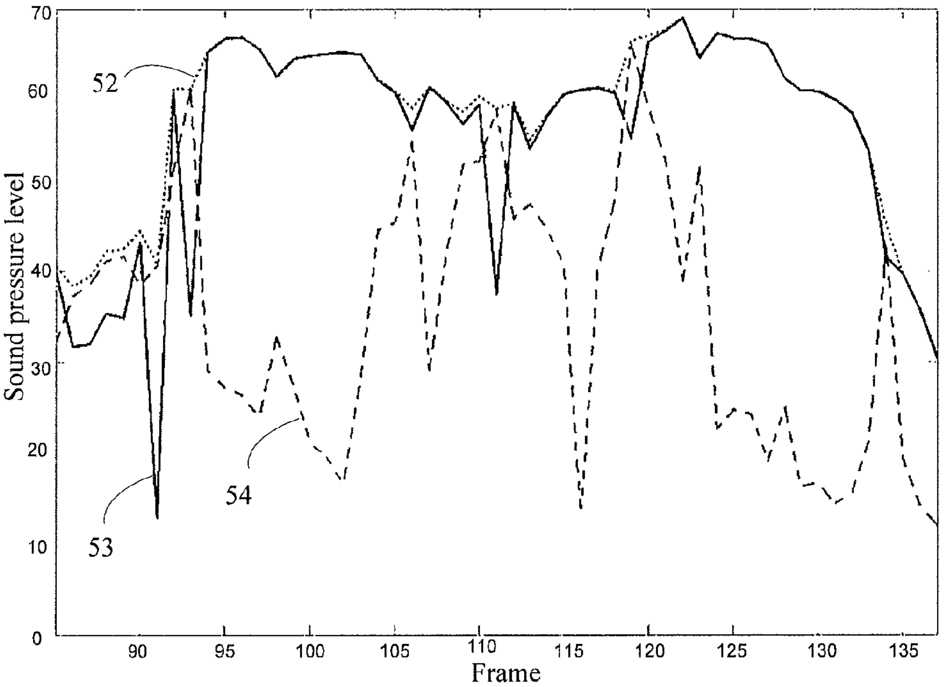

FIG. 5A and FIG. 5B are schematic diagrams of distribution curves of sound pressure levels according to an embodiment of the present invention. Referring to FIG. 5A, 51 is an input signal, a horizontal axis represents sampling points, and a vertical axis represents normalized amplitude. This figure includes abrupt interruption that occurs at a plurality of locations and lasts for a relatively short time. In FIG. 5B, curves of a total sound pressure level 52, a tonal component sound pressure level 53, and a non-tonal component sound pressure level 54 are separately provided, where a horizontal axis represents sampling points, and a vertical axis represents a value of a sound pressure level. Because features of sound pressure levels on interruption locations 55 in FIG. 5A all meet the foregoing condition, it indicates that interruption at these locations is located in an area with relatively rich tonal components and is real abrupt interruption.

S46-2. For another result detected in rough detection, including abrupt start or abrupt stop that occurs alone, it may be determined, according to a change of a tonal component sound pressure level of the $k^{th}$ frame, whether the potential abrupt exception of a voice signal is real abrupt.

For a normal voice signal, relatively evident sudden change of energy may be detected at start of the rough detection. However, a changing process in which a tonal component of the normal voice signal grows out of nothing is inevitably natural transition. If spl_tonal(k) grows excessively rapidly, it indicates that the changing process in which the tonal component of the normal voice signal grows out of nothing is unnatural, and corresponding start is abrupt start. A principle of detecting abrupt stop is similar to this.

Figure 6A:
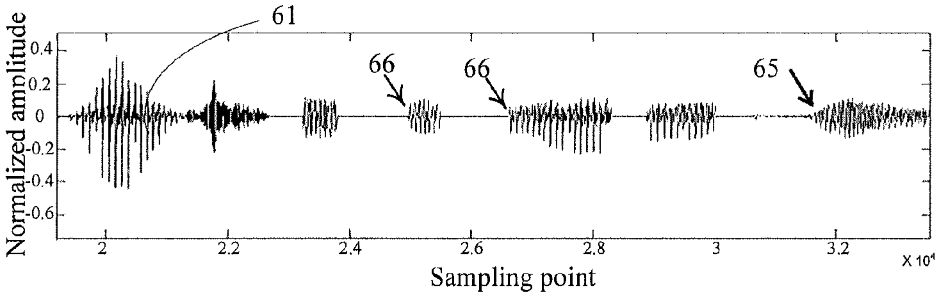
FIG. 6A and FIG. 6B are schematic diagrams of distribution curves of sound pressure levels according to another embodiment of the present invention.
Figure 6B:
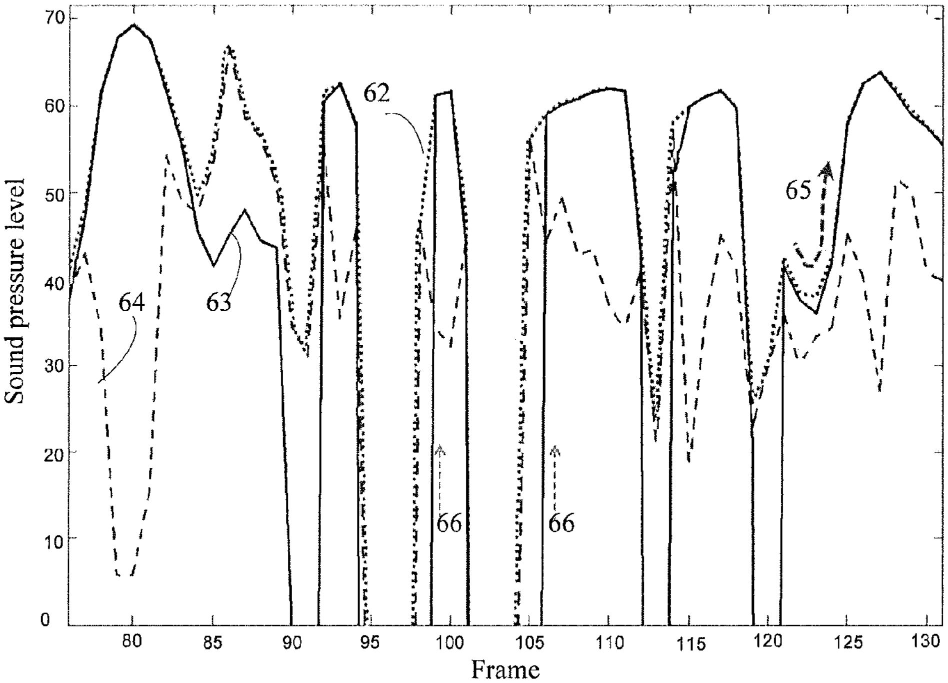

FIG. 6A and FIG. 6B are schematic diagrams of distribution curves of sound pressure levels according to another embodiment of the present invention. Referring to FIG. 6A, 61 is an input signal, a horizontal axis represents sampling points, and a vertical axis represents normalized amplitude.

In FIG. 6B, a total sound pressure level 62, a tonal component sound pressure level 63, and a non-tonal component sound pressure level 64 are separately provided. An arrow 65 in FIG. 6B represents a change trend of spl_tonal(k) at a location of natural start and an arrow 66 represents a change trend of spl_tonal(k) at a location of abrupt start. As shown in the figure, spl_tonal(k) at the location of abrupt start grows rapidly, and natural transition occurs in the change trend of spl_tonal(k) at the location of natural start.

Steps of detecting abrupt start include S46-2-1 and S46-2-2. If S46-2-1 is true, it is further determined whether S46-2-2 is true. If S46-2-2 is true, the potential abrupt start of a voice signal is real abrupt start; and if S46-2-2 is false, the abrupt start is not real abrupt start. If S46-2-1 is false, it is not necessary to determine whether S46-2-2 is true, and the potential abrupt start of a voice signal is certainly not real abrupt start.

S46-2-1. Determine whether either of the following conditions j or m is met.

j) (spl_total(k)−spl_total(k−1)≥$a_6$) and (spl_total(k−1) and spl_total(k−2) grow gently), where k≥2, and it is preset that a total sound pressure level of the $0^{th}$ frame and a total sound pressure level of the $1^{st}$ frame grow gently.

m) (spl_total(k)−spl_total(k−2)≥$a_6$),
(spl_total(k)>spl_total(k−1)),
(spl_total(k−1)22 spl_total(k−2)), and
(spl_total(k−1) and spl_total(k−2) grow gently), where k≥2, and it is preset that a total sound pressure level of the $0^{th}$ frame and a total sound pressure level of the $1^{st}$ frame grow gently.

If either of the conditions j or m is met, it is determined that spl_total(k) of the $k^{th}$ frame grows excessively rapidly. Then, S46-2-2 is performed. If neither of the conditions j nor m is met, it is not necessary to further determine whether S46-2-2 is true, and the potential abrupt start of a voice signal is certainly not real abrupt start.

That the total sound pressure level grows gently is different from that the total sound pressure level grows excessively rapidly. The growing gently refers to that neither of the foregoing conditions j and m for determining that the growth is excessively rapidly is met. It should be specifically noted herein that, in actual processing, several initial frames are initially set to grow gently, and the determining begins only on a frame after the foregoing several frames. Because each frame lasts for only tens of milliseconds in actual application, detection results of the several initial frames are omitted.

S46-2-2. If it is detected, according to the condition j or m, that one of spl_total(k), spl_total(k−1), and spl_total(k+1) grows excessively rapidly, determine whether either of the following condition n and condition p is met.

n) (spl_tonal(k+1)≥$a_7$),
(spl_tonal(k)$<a_8$),
(spl_tonal(k+1)−sp_non_tonal(k)>0), and
(spl_non_tonal(k−1)$<a_9$).

p) (spl_tonal(k+2)≥$a_{10}$),
(spl_tonal(k+1)$<a_{11}$),
(spl_tonal(k+2)−sp_non_tonal(k+1)>0), and
(spl_non_tonal(k)$<a_{12}$).

If either of the condition n or the condition p is met, the potential abrupt exception of a voice signal included in the target first timeframe included in the $k^{th}$ frame is real abrupt start of a voice signal. If neither the condition n nor the condition p is met, the potential abrupt exception of a voice signal included in the target first timeframe included in the $k^{th}$ frame is not real abrupt start.

In addition, steps of detecting abrupt stop include S46-2-3 and S46-2-4. If S46-2-3 is true, it is further determined whether S46-2-4 is true. If S46-2-4 is true, the potential abrupt stop of a voice signal is real abrupt stop; and if S46-2-4 is false, the potential abrupt stop of a voice signal is not real abrupt stop. If S46-2-3 is false, it is not necessary to determine whether S46-2-4 is true, and the potential abrupt stop of a voice signal is certainly not real abrupt stop.

S46-2-3.

Determine whether either of the following condition q or r is met.

q) (spl_total(k−1)−spl_total(k)≥$a_6$) and (spl_total(k−1) and spl_total(k−2) decrease gently), where k≥2, and it is preset that a total sound pressure level of the $0^{th}$ frame and a total sound pressure level of the $1^{st}$ frame decreases gently.

r) (spl_total(k−2)−spl_total(k)≥$a_6$),
(spl_total(k−1)>spl_total(k)),
(spl_total(k−2)>spl_total(k−1)), and
(spl_total(k−1) and spl_total(k−2) decrease gently), where k≥2, and it is preset that a total sound pressure level of the $0^{th}$ frame and a total sound pressure level of the $1^{st}$ frame decreases gently.

If spl_tonal(k) decreases excessively rapidly, it indicates that spl_total(k) of the $k^{th}$ frame decreases excessively rapidly. Then, S46-2-4 is performed. If neither of the conditions q nor r is met, it is not necessary to further determine whether S46-2-4 is true, and the potential abrupt stop of a voice signal is certainly not real abrupt stop.

That the total sound pressure level decreases gently is different from that the total sound pressure level decreases excessively rapidly. The decreasing gently refers to that neither of the foregoing conditions q nor r for determining that the decrease is excessively rapidly is met. It should be specifically noted herein that, in actual processing, several initial frames are initially set to decrease gently, and the determining begins only on a frame after the foregoing several frames. Because each frame lasts for only tens of milliseconds in actual application, detection results of the several initial frames are omitted.

S46-2-4. If it is detected, according to the condition q or r, that one of spl_total(k), spl_total(k−1), and spl_total(k+1) decreases excessively rapidly, determine whether either of the following condition s or condition t is met.

s) (spl_tonal(k−1)≥$a_7$),
(spl_tonal(k)$<a_8$),
(spl_tonal(k−1)−sp_non_tonal(k)>0), and
(spl_non_tonal(k+1)$<a_9$), where i≥1.

t) (spl_tonal(k−2)≥$a_{10}$),
(spl_tonal(k−1)$<a_{11}$),
(spl_tonal(k−1)−sp_non_tonal(k−2)>0), and
(spl_non_tonal(k)$<a_{12}$), where i≥2.

In this embodiment, $a_6=25$, $a_7=47$, $a_{10}=50$, and $a_8=a_9=a_{11}=a_{12}=10$.

If either of the condition s or the condition t is met, the potential abrupt exception of a voice signal included in the target first timeframe included in the $k^{th}$ frame is real abrupt stop of a voice signal. If neither the condition s nor the condition t is met, the potential abrupt exception of a voice signal included in the target first timeframe included in the $k^{th}$ frame is not real abrupt stop.

This embodiment of the present invention provides a method for detecting a voice signal, where a real abrupt exception of a voice signal can be determined by first detecting a potential abrupt exception of a voice signal and further analyzing a tone feature of the potential abrupt exception of a voice signal, so that accuracy in detecting an abrupt exception of a voice signal is effectively improved.

Figure 7A:
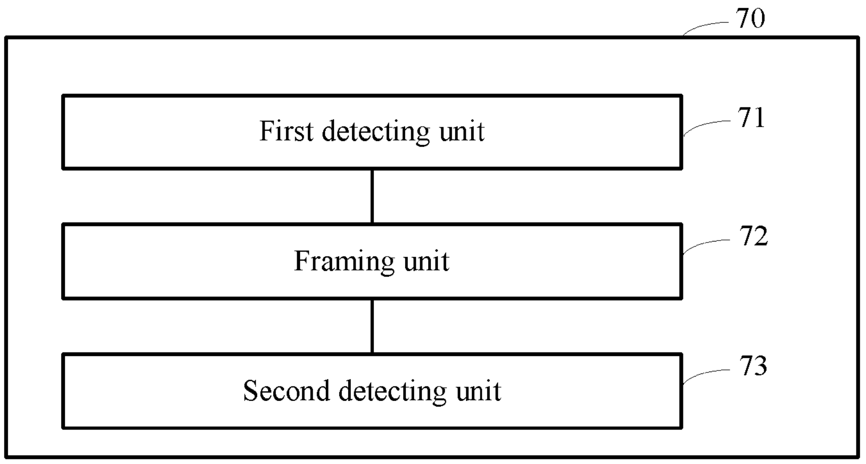
FIG. 7A and FIG. 7B each is a schematic block diagram of an apparatus for detecting a voice signal according to an embodiment of the present invention.

FIG. 7A is a schematic block diagram of an apparatus 70 for detecting a voice signal according to an embodiment of the present invention. The apparatus 70 includes: a first detecting unit 71, a framing unit 72, and a second detecting unit 73.

The first detecting unit 71 is configured to: perform, in a unit of first timeframe frame length, framing on a continuous voice sample to obtain a plurality of first timeframes, detect energy of each of the first timeframes, and determine a target first timeframe including a potential abrupt exception of a voice signal by analyzing a relationship between the energy of the plurality of first timeframes, where the potential abrupt exception of a voice signal includes one of potential abrupt interruption, abrupt start, and abrupt stop of a voice signal.

The framing unit 72 is configured to perform, in a unit of second timeframe frame length, framing on the continuous voice sample to obtain a plurality of second timeframes, where a frame length of each of the second timeframes is an integral multiple of the first timeframe frame length, and a second timeframe including the target first timeframe is a target second timeframe.

The second detecting unit 73 is configured to: process each of the second timeframes to acquire a tone feature, and determine, by analyzing a tone feature of at least one of the second timeframes including at least one of the target second timeframe, whether the potential abrupt exception of a voice signal included in the target first timeframe included in the target second timeframe is a real abrupt exception of a voice signal.

This embodiment of the present invention provides an apparatus for detecting a voice signal, where a real abrupt exception of a voice signal can be determined by first detecting a potential abrupt exception of a voice signal and further analyzing a tone feature of the potential abrupt exception of a voice signal, so that accuracy in detecting an abrupt exception of a voice signal is effectively improved.

Figure 7B:
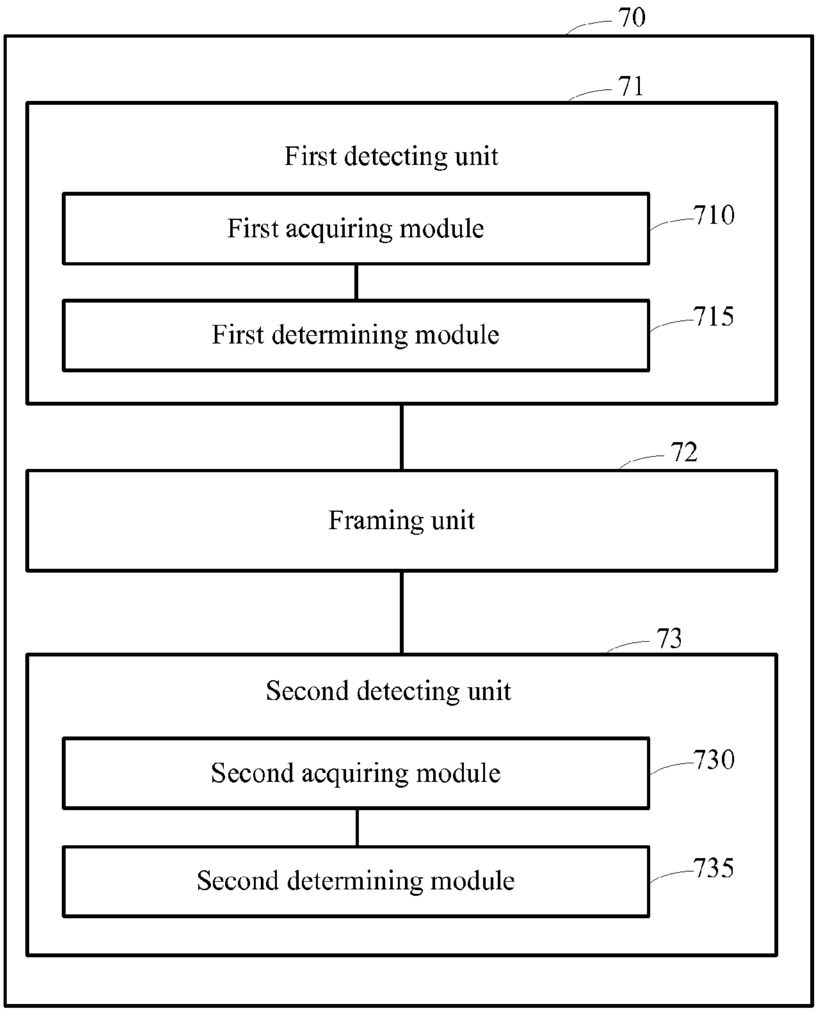

In another embodiment, FIG. 7B is a schematic block diagram of an apparatus 70 for detecting a voice signal according to another embodiment of the present invention. Different from the apparatus 70 in FIG. 7A, the first detecting unit 71 may specifically further include: a first acquiring module 710 and a first determining module 715; and the second detecting unit 73 may specifically further include: a second acquiring module 730 and a second determining module 735.

The first acquiring module 710 is configured to: perform framing on the continuous voice sample in a unit of first timeframe frame length, to divide the continuous voice sample into the plurality of first timeframes according to a chronological order, and acquire energy frame_energy_short (i) of each of the first timeframes, where the $i^{th}$ frame is the $i^{th}$ first timeframe in the plurality of first timeframes, and i is a natural number.

Optionally, as a different embodiment, the first determining module 715 is configured to: if the relationship between the energy of the first timeframes meets (frame_energy_short (i−1)−frame_energy_short(i)≥$a_2$) and (frame_energy_short (i)<$a_1$), determine that the $i^{th}$ frame is a target first timeframe including potential abrupt stop of a voice signal, where $a_1$ and $a_2$ are a preset first threshold and a preset second threshold, respectively, and i≥1.

Optionally, as a different embodiment, the first determining module 715 is configured to: if the relationship between the energy of the first timeframes meets (frame_energy_short (i−2)−frame_energy_short(i)≥$a_2$) and (frame_energy_short (i)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt stop of a voice signal, determine that the $i^{th}$ frame is the target first timeframe including potential abrupt stop of a voice signal, where i≥2 and the $0^{th}$ frame and the $1^{st}$ frame are preset as first timeframes not including potential abrupt stop of a voice signal.

Optionally, as a different embodiment, the first determining module 715 is configured to: if the relationship between the energy of the first timeframes meets (frame_energy_short (i−3)−frame_energy_short(i)≥$a_2$) and (frame_energy_short (i)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt stop, determine that the $i^{th}$ frame is the target first timeframe including potential abrupt stop of a voice signal, where i≥3 and the $0^{th}$ frame, the $1^{st}$ frame, and the $2^{nd}$ frame are preset as first timeframes not including potential abrupt stop of a voice signal.

Optionally, as a different embodiment, the first determining module 715 is configured to: if the relationship between the energy of the first timeframes meets (frame_energy_short (i)−frame_energy_short(i−1)≥$a_2$) and (frame_energy_short (i−1)<$a_1$), determine that the $i^{th}$ frame is a target first timeframe including potential abrupt start of a voice signal, where $a_1$ and $a_2$ are a preset first threshold and a preset second threshold, respectively, and i≥1.

Optionally, as a different embodiment, the first determining module 715 is configured to: if the relationship between the energy of the first timeframes meets (frame_energy_short (i)−frame_energy_short(i−2)≥$a_2$) and (frame_energy_short (i−2)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt start of a voice signal, determine that the $i^{th}$ frame is the target first timeframe including potential abrupt start of a voice signal, where i≥2 and the $0^{th}$ frame and the $1^{st}$ frame are preset as first timeframes not including potential abrupt start of a voice signal.

Optionally, as a different embodiment, the first determining module 715 is configured to: if the relationship between the energy of the first timeframes meets (frame_energy_short (i)−frame_energy_short(i−3)≥$a_2$) and (frame_energy_short (i−3)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt start of a voice signal, determine that the $i^{th}$ frame is the target first timeframe including potential abrupt start of a voice signal, where i≥3 and the $0^{th}$ frame, the $1^{st}$ frame, and the $2^{nd}$ frame are preset as first timeframes not including potential abrupt start of a voice signal.

The second acquiring module 730 is configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, where the $k^{th}$ frame is the $k^{th}$ second timeframe in the plurality of second timeframes and k is a natural number.

Optionally, as a different embodiment, the second determining module 735 is configured to: if a tone feature of the target second timeframe meets spl_tonal(k)≥$a_3$, determine that the potential abrupt exception of a voice signal included in the $k^{th}$ frame is real abrupt interruption of a voice signal; or if a tone feature of the target second timeframe meets ($a_4$≤spl_tonal(k)<$a_1$) and (spl_total(k)>=$a_5$), determine that the potential abrupt exception of a voice signal included in the $k^{th}$ frame is real abrupt interruption of a voice signal, where $a_3$, $a_4$, and $a_5$ are a preset third threshold, a preset fourth threshold, and a preset fifth threshold, respectively.

Optionally, as a different embodiment, the second determining module 735 is configured to determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+1)≥$a_7$), (spl_tonal(k)<$a_8$), (spl_tonal(k+1)−sp_non_tonal(k)>0), and (spl_non_tonal(k−1)<$a_9$), determine that the potential abrupt exception of a voice signal included in the $k^{th}$ frame is real abrupt start of a voice signal; or determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+2)≥$a_{10}$), (spl_tonal(k+1)<$a_{11}$), (spl_tonal(k+2)−sp_non_tonal(k+1)>0), and (spl_non_tonal(k)<$a_{12}$), determine that the potential abrupt exception of a voice signal included in the $k^{th}$ frame is real abrupt start of a voice signal, where $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k)−spl_total(k−1)≥$a_6$) and (spl_total (k−1) and spl_total(k−2) grow gently), determining that spl_tonal(k) grows excessively rapidly, where k>2, and it is preset that a total sound pressure level of the 0th frame and a total sound pressure level of the $1^{st}$ frame grow gently; or if the tone feature of the second timeframe meets (spl_total(k) spl_total(k−2)≥$a_6$), (spl_total(k)>spl_total(k−1)), (spl_total (k−1)>spl_total(k−2)), and (spl_total(k−1) and spl_total(k−2) grow gently), determining that spl_tonal(k) grows excessively rapidly, where k≥2, it is preset that a total sound pressure level of the $0^{th}$ frame and a total sound pressure level of the $1^{st}$ frame grow gently, and $a_6$ is a preset sixth threshold; or if the tone feature of the second timeframe meets neither of the foregoing two conditions, determining that spl_tonal(k) grows gently.

Optionally, as a different embodiment, the second determining module 735 is configured to determine whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

(spl_tonal(k−1)≥$a_7$), (spl_tonal(k)<$a_8$), (spl_tonal(k−1)−sp_non_tonal(k)>0), and (spl_non_tonal(k+1)<$a_9$), determine that the potential abrupt exception of a voice signal included in the $k^{th}$ frame is real abrupt stop of a voice signal, where k≥1; or determine whether one of spl_total(k), spl_total(k−1), and spl_total(k+1) decreases excessively rapidly, and if one of spl_total(k), spl_total(k−1), and spl_total (k+1) decreases excessively rapidly, and the tone feature of the second timeframe meets:

(spl_tonal(k−2)≥$a_{10}$), (spl_tonal(k−1)<$a_{11}$), (spl_tonal(k−1)−sp_non_tonal(k−2)>0), and (spl_non_tonal(k)<$a_{12}$), determine that the potential abrupt exception of a voice signal included in the $k^{th}$ frame is real abrupt stop of a voice signal, where k≥2, and $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k−1)−spl_total(k)≥$a_6$) and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if the tone feature of the second timeframe meets (spl_total(k−2)−spl_total(k)≥$a_6$), (spl_total(k−1)>spl_total (k)), (spl_total(k−2)>spl_total(k−1)), and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if neither of the foregoing two conditions is met, determining that spl_total(k) decreases gently, where $a_6$ is a preset sixth threshold.

The apparatus 70 implements the methods 30 and 40. For brevity, specific details are not provided herein again.

Figure 8:
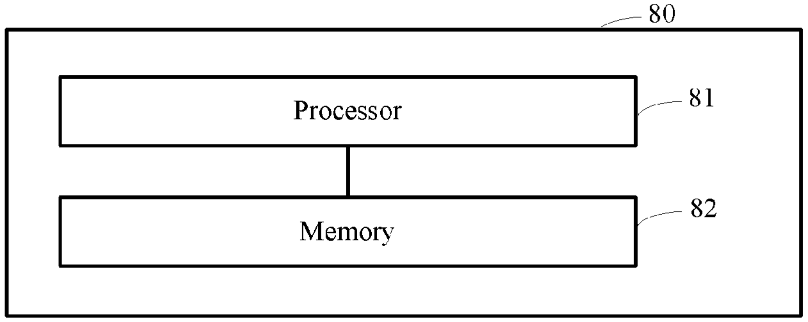
FIG. 8 is a schematic block diagram of an apparatus for detecting a voice signal according to another embodiment of the present invention.

FIG. 8 is a schematic block diagram of an apparatus 80 for detecting a voice signal according to another embodiment of the present invention. The apparatus 80 includes components such as a processor 81 and a memory 82, where the components communicate with each other by using a bus.

The processor 81 is configured to execute a program of this embodiment of the present invention that is stored in the memory 82 and perform bidirectional communication with another apparatus by using the bus.

The memory 82 may include a RAM and a ROM, or any fixed storage medium, or a mobile storage medium, and is configured to store a program that can execute this embodiment of the present invention, or to-be-processed data in this embodiment of the present invention, or a detection result for subsequent application.

The memory 82 and the processor 81 may be integrated into a physical module to which this embodiment of the present invention is applied, and the program that implements this embodiment of the present invention is stored and operates on the physical module.

In this embodiment of the present invention, the processor 81 performs, in a unit of first timeframe frame length, framing on a continuous voice sample to obtain a plurality of first timeframes, detects energy of each of the first timeframes, and determines a target first timeframe including a potential abrupt exception of a voice signal by analyzing a relationship between the energy of the plurality of first timeframes, where the potential abrupt exception of a voice signal includes one of potential abrupt interruption, abrupt start, and abrupt stop of a voice signal; performs, in a unit of second timeframe frame length, framing on the continuous voice sample to obtain a plurality of second timeframes, where a frame length of each of the second timeframes is an integral multiple of the first timeframe frame length, and a second timeframe including the target first timeframe is a target second timeframe; and processes each of the second timeframes to acquire a tone feature, and determines, by analyzing a tone feature of at least one of the second timeframes including at least one of the target second timeframe, whether the potential abrupt exception of a voice signal included in the target first timeframe included in the target second timeframe is a real abrupt exception of a voice signal.

After it is determined whether the potential abrupt exception of a voice signal is a real abrupt exception of a voice signal, the processor may send the result to the memory for storage, so that other processing is performed.

The processor 81 may specifically perform framing on the continuous voice sample in a unit of first timeframe frame length, to divide the continuous voice sample into the plurality of first timeframes according to a chronological order, and acquire energy frame_energy_short(i) of each of the first timeframes, where the $i^{th}$ frame is the $i^{th}$ first timeframe in the plurality of first timeframes, and i is a natural number; and next, by analyzing the relationship between the acquired energy of the first timeframes and referring to the conditions a to f, determine that the $i^{th}$ frame is the target first timeframe including a potential abrupt exception of a voice signal.

Optionally, as a different embodiment, the processor 81 is configured to: if the relationship between the energy of the first timeframes meets (frame_energy_short(i−2)−frame_energy_short(i)≥$a_2$) and (frame_energy_short(i)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt stop of a voice signal, determine that the $i^{th}$ frame is the target first timeframe including potential abrupt stop of a voice signal, where i≥2 and the $0^{th}$ frame and the $1^{st}$ frame are preset as first timeframes not including potential abrupt stop of a voice signal.

Optionally, as a different embodiment, the processor 81 is configured to: if the relationship between the energy of the first timeframes meets (frame_energy_short(i−3)−frame_energy_short(i)≥$a_2$) and (frame_energy_short(i)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt stop, determine that the $i^{th}$ frame is the target first timeframe including potential abrupt stop of a voice signal, where i≥3 and the $0^{th}$ frame, the $1^{st}$ frame, and the $2^{nd}$ frame are preset as first timeframes not including potential abrupt stop of a voice signal.

Optionally, as a different embodiment, the processor 81 is configured to: if the relationship between the energy of the first timeframes meets (frame_energy_short(i)−frame_energy_short(i−1)≥$a_2$) and (frame_energy_short(i−1)<$a_1$), determine that the $i^{th}$ frame is a target first timeframe including potential abrupt start of a voice signal, where $a_1$ and $a_2$ are a preset first threshold and a preset second threshold, respectively, and i≥1.

Optionally, as a different embodiment, the processor 81 is configured to: if the relationship between the energy of the first timeframes meets (frame_energy_short(i)−frame_energy_short(i−2)≥$a_2$) and (frame_energy_short(i−2)<$a_1$), where $a_1$ and $a_2$ are a preset first threshold and a preset second threshold, respectively, and neither the $(i-1)^{th}$ frame nor the $(i-2)^{th}$ frame is a target first timeframe including potential abrupt start of a voice signal, determine that the $i^{th}$ frame is the target first timeframe including potential abrupt start of a voice signal, where i≥2 and the $0^{th}$ frame and the $1^{st}$ frame are preset as first timeframes not including potential abrupt start of a voice signal.

Optionally, as a different embodiment, the processor 81 is configured to: if the relationship between the energy of the first timeframes meets (frame_energy_short(i)−frame_energy_short(i−3)≥$a_2$) and (frame_energy_short(i−3)<$a_1$), where $a_1$ and $a_2$ are a preset first threshold and a preset second threshold, respectively, and none of the $(i-1)^{th}$ frame to the $(i-3)^{th}$ frame is a target first timeframe including potential abrupt start of a voice signal, determine that the $i^{th}$ frame is the target first timeframe including potential abrupt start of a voice signal, where i≥3 and the $0^{th}$ frame, the $1^{st}$ frame, and the $2^{nd}$ frame are preset as first timeframes not including potential abrupt start of a voice signal.

Next, the processor 81 is configured to: perform tone detection processing on one or more second timeframes according to a chronological order, and acquire a total sound pressure level (spl_total(k)), a tonal component sound pressure level (spl_tonal(k)), and a non-tonal component sound pressure level (spl_non_tonal(k)) of the $k^{th}$ frame, where the $k^{th}$ frame is the $k^{th}$ second timeframe in the plurality of second timeframes and k is a natural number. Finally, the processor 81 determines, by analyzing whether the tone feature of the target second timeframe meets the conditions g to t, whether the potential abrupt exception of a voice signal included in the $k^{th}$ frame is real abrupt interruption of a voice signal.

Optionally, as a different embodiment, the processor 81 is configured to: if a tone feature of the target second timeframe meets spl_tonal(k)≥$a_3$, determine that the potential abrupt exception of a voice signal included in the $k^{th}$ frame is real abrupt interruption of a voice signal; or if a tone feature of the target second timeframe meets ($a_4$≤spl_tonal(k)<$a_3$) and (spl_ total(k)>=$a_5$), determine that the potential abrupt exception of a voice signal included in the $k^{th}$ frame is real abrupt interruption of a voice signal, where $a_3$, $a_4$, and $a_5$ are a preset third threshold, a preset fourth threshold, and a preset fifth threshold, respectively.

Optionally, as a different embodiment, the processor 81 is configured to: determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+1)≥$a_7$),
(spl_tonal(k)<$a_8$),
(spl_tonal(k+1)−sp_non_tonal(k)>0), and
(spl_non_tonal(k−1)<$a_9$), determine that the potential abrupt exception of a voice signal included in the $k^{th}$ frame is real abrupt start of a voice signal; or determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+2)≥$a_{10}$),
(spl_tonal(k+1)<$a_{11}$),
(spl_tonal(k+2)−sp_non_tonal(k+1)>0), and
(spl_non_tonal(k)<$a_{12}$), determine that the potential abrupt exception of a voice signal included in the $k^{th}$ frame is real abrupt start of a voice signal, where $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k)−spl_total(k−1)≥$a_6$) and (spl_total (k−1) and spl_total(k−2) grow gently), determining that spl_tonal(k) grows excessively rapidly, where k≥2, and it is preset that a total sound pressure level of the $0^{th}$ frame and a total sound pressure level of the $1^{st}$ frame grow gently; or if the tone feature of the second timeframe meets (spl_total(k)−spl_total(k−2)≥$a_6$), (spl_total(k)>spl_total(k−1)), (spl_total (k−1)>spl_total(k−2)), and (spl_total(k−1) and spl_total(k−2) grow gently), determining that spl_tonal(k) grows excessively rapidly, where k≥2, it is preset that a total sound pressure level of the $0^{th}$ frame and a total sound pressure level of the $1^{st}$ frame grow gently, and $a_6$ is a preset sixth threshold; or if the tone feature of the second timeframe meets neither of the foregoing two conditions, determining that spl_tonal(k) grows gently.

Optionally, as a different embodiment, the processor 81 is configured to determine whether one of spl_total(k), spl_total (k−1), and spl_total(k+1) decreases excessively rapidly, and if one of spl_total(k), spl_total(k−1), and spl_total(k+1) decreases excessively rapidly, and the tone feature of the second timeframe meets:

(spl_tonal(k−1)≥$a_7$), (spl_tonal(k)<$a_8$), (spl_tonal(k−1)−sp_non_tonal(k)>0), and (spl_non_tonal(k+1)<$a_9$), determine that the potential abrupt exception of a voice signal included in the $k^{th}$ frame is real abrupt stop of a voice signal, where k≥1; or determine whether one of spl_total(k), spl_total(k−1), and spl_total(k+1) decreases excessively rapidly, and if one of spl_total(k), spl_total(k−1), and spl_total (k+1) decreases excessively rapidly, and the tone feature of the second timeframe meets:

(spl_tonal(k−2)≥$a_{10}$), (spl_tonal(k−1)<$a_{11}$), (spl_tonal(k−1)−sp_non_tonal(k−2)>0), and (spl_non_tonal(k)<$a_{12}$), determine that the potential abrupt exception of a voice signal included in the $k^{th}$ frame is real abrupt stop of a voice signal, where k≥2, and $a_7$ to $a_{12}$ are a preset seventh threshold to a preset twelfth threshold; and the determining whether one of spl_total(k), spl_total(k−1), and spl_total(k+1) grows excessively rapidly includes: if the tone feature of the second timeframe meets (spl_total(k−1)−spl_total(k)≥$a_6$) and (spl_total(k−1) and spl_total(k−2) decrease gently), determining that spl_total(k) decreases excessively rapidly, where k≥2, and it is preset that a total sound pressure level of the $0^{th}$ frame and a total sound pressure level of the $1^{st}$ frame decreases gently; or if the tone feature of the second timeframe meets (spl_total(k−2)−spl_total(k)≥$a_6$), (spl_total(k−1)>spl_total (k)), (spl_total(k−2)>spl_total(k−1)), and (spl_total(k−1) and spl_total(k−2) decrease gently), determining that spl_total(k) decreases excessively rapidly, where k>2, and it is preset that a total sound pressure level of the $0^{th}$ frame and a total sound pressure level of the $1^{st}$ frame decreases gently; or if neither of the foregoing two conditions is met, determining that spl_total(k) decreases gently, where $a_6$ is a preset sixth threshold.

The apparatus 80 implements the methods 30 and 40 in the embodiments of the present invention. For brevity, specific details are not provided herein again.

This embodiment of the present invention provides an apparatus for detecting a voice signal, where a real abrupt exception of a voice signal can be determined by first detecting a potential abrupt exception of a voice signal and further analyzing a tone feature of the potential abrupt exception of a voice signal, so that accuracy in detecting an abrupt exception of a voice signal is effectively improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for detecting a voice signal, comprising:

performing, in a unit of first timeframe frame length, framing on a continuous voice sample to obtain a plurality of first timeframes, detecting energy of each of the first timeframes, and determining a target first timeframe comprising a potential abrupt exception of a voice signal by analyzing a relationship between the energy of the plurality of first timeframes, wherein the potential abrupt exception of a voice signal comprises one of potential abrupt interruption, abrupt start, and abrupt stop of a voice signal;

performing, in a unit of second timeframe frame length, framing on the continuous voice sample to obtain a plurality of second timeframes, wherein a frame length of each of the second timeframes is an integral multiple of the first timeframe frame length, and a second timeframe comprising the target first timeframe is a target second timeframe; and processing each of the second timeframes to acquire a tone feature, and determining, by analyzing a tone feature of at least one of the second timeframes comprising at least one of the target first timeframe, whether the potential abrupt exception of a voice signal comprised in the target first timeframe comprised in the target second timeframe is a real abrupt exception of a voice signal.

2. The method according to claim 1, wherein the performing, in a unit of first timeframe frame length, framing on a continuous voice sample to obtain a plurality of first timeframes, detecting energy of each of the first timeframes comprises:

performing framing on the continuous voice sample in a unit of first timeframe frame length, to divide the continuous voice sample into the plurality of first timeframes according to a chronological order; and acquiring energy frame_energy_short(i) of each of the first timeframes, wherein the $i^{th}$ frame is the $i^{th}$ first timeframe in the plurality of first timeframes, and i is a natural number.

3. The method according to claim 2, the determining a target first timeframe comprising a potential abrupt exception of a voice signal by analyzing a relationship between the energy of the first timeframes comprises:

if the relationship between the energy of the first timeframes meets (frame_energy_short(i−1)−frame_energy_short(i)≥$a_2$) and (frame_energy_short(i)<$a_1$), determining that the $i^{th}$ frame is a target first timeframe comprising potential abrupt stop of a voice signal, wherein $a_1$ and $a_2$ are a preset first threshold and a preset second threshold, respectively, and i≥1.

4. The method according to claim 2, wherein the determining a target first timeframe comprising a potential abrupt exception of a voice signal by analyzing a relationship between the energy of the first timeframes comprises:

if the relationship between the energy of the first timeframes meets (frame_energy_short(i−2)−frame_energy_short(i)≥$a_2$) and (frame_energy_short(i)<$a_1$), wherein $a_1$ and $a_2$ are a preset first threshold and a preset second threshold, respectively, and neither the $(i-1)^{th}$ frame nor the $(i-2)^{th}$ frame is a target first timeframe comprising potential abrupt stop of a voice signal, determining that the $i^{th}$ frame is the target first timeframe comprising potential abrupt stop of a voice signal, wherein i≥2 and the $0^{th}$ frame and the $1^{st}$ frame are preset as first timeframes not comprising potential abrupt stop of a voice signal.

5. The method according to claim 2, wherein the determining a target first timeframe comprising a potential abrupt exception of a voice signal by analyzing a relationship between the energy of the first timeframes comprises:

if the relationship between the energy of the first timeframes meets (frame_energy_short(i−3)−frame_energy_short(i)≥$a_2$) and (frame_energy_short(i)<$a_1$), wherein $a_1$ and $a_2$ are a preset first threshold and a preset second threshold, respectively, and none of the $(i-1)^{th}$ frame to the $(i-3)^{th}$ frame is a target first timeframe comprising potential abrupt stop, determining that the $i^{th}$ frame is the target first timeframe comprising potential abrupt stop of a voice signal, wherein i≥3 and the $0^{th}$ frame, the $1^{st}$ frame, and the $2^{nd}$ frame are preset as first timeframes not comprising potential abrupt stop of a voice signal.

6. The method according to claim 2, wherein the determining a target first timeframe comprising a potential abrupt exception of a voice signal by analyzing a relationship between the energy of the first timeframes comprises:

if the relationship between the energy of the first timeframes meets (frame_energy_short(i)−frame_energy_short(i−1)≥$a_2$) and (frame_energy_short(i−1)<$a_1$), determining that the $i^{th}$ frame is a target first timeframe comprising potential abrupt start of a voice signal, wherein $a_1$ and $a_2$ are a preset first threshold and a preset second threshold, respectively, and i≥1.

7. The method according to claim 2, wherein the determining a target first timeframe comprising a potential abrupt exception of a voice signal by analyzing a relationship between the energy of the first timeframes comprises:

if the relationship between the energy of the first timeframes meets (frame_energy_short(i)−frame_energy_short(i−2)≥$a_2$) and (frame_energy_short(i−2)<$a_1$), wherein $a_1$ and $a_2$ are a preset first threshold and a preset second threshold, respectively, and neither the $(i-1)^{th}$ frame nor the $(i-2)^{th}$ frame is a target first timeframe comprising potential abrupt start of a voice signal, determining that the $i^{th}$ frame is the target first timeframe comprising potential abrupt start of a voice signal, wherein i≥2 and the $0^{th}$ frame and the $1^{st}$ frame are preset as first timeframes not comprising potential abrupt start of a voice signal.

8. The method according to claim 2, wherein the determining a target first timeframe comprising a potential abrupt exception of a voice signal by analyzing a relationship between the energy of the first timeframes further comprises:

if the relationship between the energy of the first timeframes meets (frame_energy_short(i)−frame_energy_short(i−3)≥$a_2$) and (frame_energy_short(i−3)<$a_1$), wherein $a_1$ and $a_2$ are a preset first threshold and a preset second threshold, respectively, and none of the $(i-1)^{th}$ frame to the $(i-3)^{th}$ frame is a target first timeframe comprising potential abrupt start of a voice signal, determining that the $i^{th}$ frame is the target first timeframe comprising potential abrupt start of a voice signal, wherein i≥3 and the $0^{th}$ frame, the $1^{st}$ frame, and the $2^{nd}$ frame are preset as first timeframes not comprising potential abrupt start of a voice signal.

9. The method according to claim 1, wherein the processing each of the second timeframes to acquire a tone feature comprises:

performing tone detection processing on the plurality of second timeframes according to a chronological order; and acquiring a total sound pressure level spl_total(k), a tonal component sound pressure level spl_tonal(k), and a non-tonal component sound pressure level spl_non_tonal(k) of the $k^{th}$ frame as tone features of the $k^{th}$ frame, wherein the $k^{th}$ frame is the $k^{th}$ second timeframe in the plurality of second timeframes and k is a natural number.

10. The method according to claim 9, wherein the determining, by analyzing a tone feature of at least one of the second timeframes comprising at least one of the target first timeframe, whether the potential abrupt exception of a voice signal comprised in the target first timeframe comprised in the target second timeframe is a real abrupt exception of a voice signal comprises:

if a tone feature of the target second timeframe meets spl_tonal(k)≥$a_3$, determining that the potential abrupt exception of a voice signal comprised in the $k^{th}$ frame is real abrupt interruption of a voice signal; or if a tone feature of the target second timeframe meets $(a_4 \le spl\_tonal(k) < a_1)$ and $(spl\_total(k) >= a_5)$, determining that the potential abrupt exception of a voice signal comprised in the $k^{th}$ frame is real abrupt interruption of a voice signal, wherein $a_3$, $a_4$, and $a_5$ are a preset third threshold, a preset fourth threshold, and a preset fifth threshold, respectively.

11. The method according to claim 9, wherein the determining, by analyzing a tone feature of at least one of the second timeframes comprising at least one of the target first timeframe, whether the potential abrupt exception of a voice signal comprised in the target first timeframe comprised in the target second timeframe is a real abrupt exception of a voice signal comprises:

determining whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

$(spl\_tonal(k+1) \ge a_7)$, $(spl\_tonal(k) < a_8)$, $(spl\_tonal(k+1) - sp\_non\_tonal(k) > 0)$, and $(spl\_non\_tonal(k-1) < a_9)$, determining that the potential abrupt exception of a voice signal comprised in the $k^{th}$ frame is real abrupt start of a voice signal; or determining whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

$(spl\_tonal(k+2) \ge a_{10})$, $(spl\_tonal(k+1) < a_{11})$, $(spl\_tonal(k+2)\ sp\_non\_tonal(k+1) > 0)$, and $(spl\_non\_tonal(k) < a_{12})$, determining that the potential abrupt exception of a voice signal comprised in the $k^{th}$ frame is real abrupt start of a voice signal, wherein $a_7$ to $a_{12}$ are a preset seventh threshold to a preset twelfth threshold; and the determining whether one of spl_total(k), spl_total(k−1), and spl_total(k+1) grows excessively rapidly comprises:

if the tone feature of the second timeframe meets $(spl\_total(k) - spl\_total(k-1) \ge a_6)$ and (spl_total(k−1) and spl_total(k−2) grow gently), determining that spl_tonal(k) grows excessively rapidly, wherein k≥2, and it is preset that a total sound pressure level of the $0^{th}$ frame and a total sound pressure level of the $1^{st}$ frame grow gently; or if the tone feature of the second timeframe meets $(spl\_total(k) - spl\_total(k-2) \ge a_6)$, $(spl\_total(k) > spl\_total(k-1))$, $(spl\_total(k-1) > spl\_total(k-2))$, and (spl_total(k−1) and spl_total(k−2) grow gently), determining that spl_tonal(k) grows excessively rapidly, wherein k≥2, it is preset that a total sound pressure level of the $0^{th}$ frame and a total sound pressure level of the $1^{st}$ frame grow gently, and $a_6$ is a preset sixth threshold; or if the tone feature of the second timeframe meets neither of the foregoing two conditions, determining that spl_tonal(k) grows gently.

12. The method according to claim 9, wherein the determining, by analyzing a tone feature of at least one of the second timeframes comprising at least one of the target first timeframe, whether the potential abrupt exception of a voice signal comprised in the target first timeframe comprised in the target second timeframe is a real abrupt exception of a voice signal comprises:

determining whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

$(spl\_tonal(k-1) \ge a_7)$, $(spl\_tonal(k) < a_8)$, $(spl\_tonal(k-1) - sp\_non\_tonal(k) > 0)$, and $(spl\_non\_tonal(k+1) < a_9)$, determining that the potential abrupt exception of a voice signal comprised in the $k^{th}$ frame is real abrupt stop of a voice signal, wherein k≥1; or determining whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

$(spl\_tonal(k-2) \ge a_{10})$, $(spl\_tonal(k-1) < a_{11})$, $(spl\_tonal(k-1) - sp\_non\_tonal(k-2) > 0)$, and $(spl\_non\_tonal(k) < a_{12})$, determining that the potential abrupt exception of a voice signal comprised in the $k^{th}$ frame is real abrupt stop of a voice signal, wherein k≥2, and $a_7$ to $a_{12}$ are a preset seventh threshold to a preset twelfth threshold; and the determining whether one of spl_total(k), spl_total(k−1), and spl_total(k+1) decreases excessively rapidly comprises:

if the tone feature of the second timeframe meets $(spl\_total(k-1) - spl\_total(k) \ge a_6)$ and (spl_total(k−1) and spl_total(k−2) decrease gently), determining that spl_total(k) decreases excessively rapidly, wherein k≥2, and it is preset that a total sound pressure level of the $0^{th}$ frame and a total sound pressure level of the $1^{st}$ frame decreases gently; or if the tone feature of the second timeframe meets $(spl\_total(k-2) - spl\_total(k) \ge a_6)$, $(spl\_total(k-1) > spl\_total(k))$, $(spl\_total(k-2) > spl\_total(k-1))$, and (spl_total(k−1) and spl_total(k−2) decrease gently), determining that spl_total(k) decreases excessively rapidly, wherein k≥2, and it is preset that a total sound pressure level of the $0^{th}$ frame and a total sound pressure level of the $1^{st}$ frame decreases gently; or if neither of the foregoing two conditions is met, determining that spl_total(k) decreases gently, wherein $a_6$ is a preset sixth threshold.

13. An apparatus for detecting a voice signal, comprising:

a first detecting unit, configured to: perform, in a unit of first timeframe frame length, framing on a continuous voice sample to obtain a plurality of first timeframes, detect energy of each of the first timeframes, and determine a target first timeframe comprising a potential abrupt exception of a voice signal by analyzing a relationship between the energy of the plurality of first timeframes, wherein the potential abrupt exception of a voice signal comprises one of potential abrupt interruption, abrupt start, and abrupt stop of a voice signal;

a framing unit, configured to perform, in a unit of second timeframe frame length, framing on the continuous voice sample to obtain a plurality of second timeframes, wherein a frame length of each of the second timeframes is an integral multiple of the first timeframe frame length, and a second timeframe comprising the target first timeframe is a target second timeframe; and a second detecting unit, configured to: process each of the second timeframes to acquire a tone feature, and determine, by analyzing a tone feature of at least one of the second timeframes comprising at least one of the target first timeframe, whether the potential abrupt exception of a voice signal comprised in the target first timeframe comprised in the target second timeframe is a real abrupt exception of a voice signal.

14. The apparatus according to claim 13, wherein the first detecting unit comprises:

a first acquiring module, configured to: perform framing on the continuous voice sample in a unit of first timeframe frame length, to divide the continuous voice sample into the plurality of first timeframes according to a chronological order, and acquire energy frame_energy_short(i) of each of the first timeframes, wherein the $i^{th}$ frame is the $i^{th}$ first timeframe in the plurality of first timeframes, and i is a natural number; and a first determining module, configured to: if the relationship between the energy of the first timeframes meets (frame_energy_short(i−1)−frame_energy_short(i)≥$a_2$) and (frame_energy_short(i)<$a_1$), determine that the $i^{th}$ frame is a target first timeframe comprising potential abrupt stop of a voice signal, wherein $a_1$ and $a_2$ are a preset first threshold and a preset second threshold, respectively, and i≥1.

15. The apparatus according to claim 13, wherein the first detecting unit comprises:

a first acquiring module, wherein the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, wherein the $i^{th}$ frame is the $i^{th}$ first timeframe in the plurality of first timeframes, and i is a natural number; and a first determining module, wherein the first determining module is configured to: if the relationship between the energy of the first timeframes meets (frame_energy_short(i−2)−frame_energy_short(i)≥$a_2$) and (frame_energy_short(i)<$a_1$), wherein $a_1$ and $a_2$ are a preset first threshold and a preset second threshold, respectively, and neither the $(i-1)^{th}$ frame nor the $(i-2)^{th}$ frame is a target first timeframe comprising potential abrupt stop of a voice signal, determine that the $i^{th}$ frame is the target first timeframe comprising potential abrupt stop of a voice signal, wherein i≥2 and the $0^{th}$ frame and the $1^{st}$ frame are preset as first timeframes not comprising potential abrupt stop of a voice signal.

16. The apparatus according to claim 13, wherein the first detecting unit comprises:

a first acquiring module, wherein the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, wherein the $i^{th}$ frame is the $i^{th}$ first timeframe in the plurality of first timeframes, and i is a natural number; and a first determining module, wherein the first determining module is configured to: if the relationship between the energy of the first timeframes meets (frame_energy_short(i−3)−frame_energy_short(i)≥$a_2$) and (frame_energy_short(i)<$a_1$), wherein $a_1$ and $a_2$ are a preset first threshold and a preset second threshold, respectively, and none of the $(i-1)^{th}$ frame to the $(i-3)^{th}$ frame is a target first timeframe comprising potential abrupt stop, determine that the $i^{th}$ frame is the target first timeframe comprising potential abrupt stop of a voice signal, wherein i≥3 and the $0^{th}$ frame, the $1^{st}$ frame, and the $2^{nd}$ frame are preset as first timeframes not comprising potential abrupt stop of a voice signal.

17. The apparatus according to claim 13, wherein the first detecting unit comprises:

a first acquiring module, wherein the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, wherein the $i^{th}$ frame is the $i^{th}$ first timeframe in the plurality of first timeframes, and i is a natural number; and a first determining module, configured to: if the relationship between the energy of the first timeframes meets (frame_energy_short(i)−frame_energy_short(i−1)≥$a_2$) and (frame_energy_short(i−1)<$a_1$), determine that the $i^{th}$ frame is a target first timeframe comprising potential abrupt start of a voice signal, wherein $a_1$ and $a_2$ are a preset first threshold and a preset second threshold, respectively, and i≥1.

18. The apparatus according to claim 13, wherein the first detecting unit comprises:

a first acquiring module, wherein the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, wherein the $i^{th}$ frame is the $i^{th}$ first timeframe in the plurality of first timeframes, and i is a natural number; and a first determining module, configured to: if the relationship between the energy of the first timeframes meets (frame_energy_short(i)−frame_energy_short(i−2)≥$a_2$) and (frame_energy_short(i−2)<$a_1$), wherein $a_1$ and $a_2$ are a preset first threshold and a preset second threshold, respectively, and neither the $(i-1)^{th}$ frame nor the $(i-2)^{th}$ frame is a target first timeframe comprising potential abrupt start of a voice signal, determine that the $i^{th}$ frame is the target first timeframe comprising potential abrupt start of a voice signal, wherein i≥2 and the $0^{th}$ frame and the $1^{st}$ frame are preset as first timeframes not comprising potential abrupt start of a voice signal.

19. The apparatus according to claim 13, wherein the first detecting unit comprises:

a first acquiring module, wherein the first acquiring module is configured to: perform framing on the continuous voice sample in a unit of first timeframe frame length, to divide the continuous voice sample into the plurality of first timeframes according to a chronological order, and acquire energy frame_energy_short(i) of each of the first timeframes, wherein the $i^{th}$ frame is the $i^{th}$ first timeframe in the plurality of first timeframes, and i is a natural number; and a first determining module, configured to: if the relationship between the energy of the first timeframes meets (frame_energy_short(i)−frame_energy_short(i−3)≥$a_2$) and (frame_energy_short(i−3)<$a_1$), wherein $a_1$ and $a_2$ are a preset first threshold and a preset second threshold, respectively, and none of the $(i-1)^{th}$ frame to the $(i-3)^{th}$ frame is a target first timeframe comprising potential abrupt start of a voice signal, determine that the $i^{th}$ frame is the target first timeframe comprising potential abrupt start of a voice signal, wherein i≥3 and the $0^{th}$ frame, the $1^{st}$ frame, and the $2^{nd}$ frame are preset as first timeframes not comprising potential abrupt start of a voice signal.

20. The apparatus according to claim 13, wherein the second detecting unit comprises:

a second acquiring module, configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, wherein the $k^{th}$ frame is the $k^{th}$ second timeframe in the plurality of second timeframes and k is a natural number; and a second determining module, configured to: if a tone feature of the target second timeframe meets spl_tonal(k)≥$a_3$, determine that the potential abrupt exception of a voice signal comprised in the $k^{th}$ frame is real abrupt interruption of a voice signal; or if a tone feature of the target second timeframe meets ($a_4$≤spl_tonal(k)<$a_3$) and (spl_total(k)>=$a_5$), determine that the potential abrupt exception of a voice signal comprised in the $k^{th}$ frame is real abrupt interruption of a voice signal, wherein $a_3$, $a_4$, and $a_5$ are a preset third threshold, a preset fourth threshold, and a preset fifth threshold, respectively.

21. The apparatus according to claim 13, wherein the second detecting unit comprises:

a second acquiring module, configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, wherein the $k^{th}$ frame is the $k^{th}$ second timeframe in the plurality of second timeframes and k is a natural number; and a second determining module, configured to: determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+1)≥$a_7$), (spl_tonal(k)<$a_8$), (spl_tonal(k+1)−sp_non_tonal(k)>0), and (spl_non_tonal(k−1)<$a_9$), determine that the potential abrupt exception of a voice signal comprised in the $k^{th}$ frame is real abrupt start of a voice signal; or determine whether one of spl_total(k), spl_total(k−1), and spl_total(k+1) grows excessively rapidly, and if one of spl_total(k), spl_total(k−1), and spl_total(k+1) grows excessively rapidly, and the tone feature of the second timeframe meets:

(spl_tonal(k+2)≥$a_{10}$), (spl_tonal(k+1)<$a_{11}$), (spl_tonal(k+2)−sp_non_tonal(k+1)>0), and (spl_non_tonal(k)<$a_{12}$), determine that the potential abrupt exception of a voice signal comprised in the $k^{th}$ frame is real abrupt start of a voice signal, wherein $a_7$ to $a_{12}$ are a preset seventh threshold to a preset twelfth threshold; and the second determining module is further configured to determine whether one of spl_total(k), spl_total(k−1), and spl_total(k+1) grows excessively rapidly comprises:

if the tone feature of the second timeframe meets (spl_total(k)−spl_total(k−1)≥$a_6$) and (spl_total(k−1) and spl_total(k−2) grow gently), determine that spl_tonal(k) grows excessively rapidly, wherein k≥2, and it is preset that a total sound pressure level of the $0^{th}$ frame and a total sound pressure level of the $1^{st}$ frame grow gently; or if the tone feature of the second timeframe meets (spl_total(k)−spl_total(k−2)≥$a_6$), (spl_total(k)>spl_total(k−1)), (spl_total(k−1)>spl_total(k−2)), and (spl_total(k−1) and spl_total(k−2) grow gently), determine that spl_tonal(k) grows excessively rapidly, wherein k≥2, it is preset that a total sound pressure level of the $0^{th}$ frame and a total sound pressure level of the $1^{st}$ frame grow gently, and $a_6$ is a preset sixth threshold; or if the tone feature of the second timeframe meets neither of the foregoing two conditions, determine that spl_tonal(k) grows gently.

22. The apparatus according to claim 13, wherein the second detecting unit comprises: a second acquiring module, configured to: perform tone detection processing on the plurality of second timeframes according to a chronological order, and acquire a total sound pressure level spl_total(k), a tonal component sound pressure level spl_tonal(k), and a non-tonal component sound pressure level spl_non_tonal(k) of the $k^{th}$ frame, wherein the $k^{th}$ frame is the $k^{th}$ second timeframe in the plurality of second timeframes and k is a natural number; and a second determining module, configured to: determine whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

(spl_tonal(k−1)≥$a_7$), (spl_tonal(k)<$a_8$), (spl_tonal(k−1)−sp_non_tonal(k)>0), and (spl_non_tonal(k+1)<$a_9$), determine that the potential abrupt exception of a voice signal comprised in the $k^{th}$ frame is real abrupt stop of a voice signal, wherein k≥1; or determine whether one of spl_total(k), spl_total(k−1), and spl_total(k+1) decreases excessively rapidly, and if one of spl_total(k), spl_total(k−1), and spl_total(k+1) decreases excessively rapidly, and the tone feature of the second timeframe meets:

(spl_tonal(k−2)≥$a_{10}$), (spl_tonal(k−1)<$a_{11}$), (spl_tonal(k−1)−sp_non_tonal(k−2)>0), and (spl_non_tonal(k)<$a_{12}$), determine that the potential abrupt exception of a voice signal comprised in the $k^{th}$ frame is real abrupt stop of a voice signal, wherein k≥2, and $a_7$ to $a_{12}$ are a preset seventh threshold to a preset twelfth threshold; and the determining whether one of spl_total(k), spl_total(k−1), and spl_total(k+1) grows excessively rapidly comprises:

if the tone feature of the second timeframe meets (spl_total(k−1)−spl_total(k)≥$a_6$) and (spl_total(k−1) and spl_total(k−2) decrease gently), determining that spl_total(k) decreases excessively rapidly, wherein k≥2, and it is preset that a total sound pressure level of the $0^{th}$ frame and a total sound pressure level of the $1^{st}$ frame decreases gently; or if the tone feature of the second timeframe meets (spl_total(k−2)−spl_total(k)≥$a_6$), (spl_total(k−1)>spl_total(k)), (spl_total(k−2)>spl_total(k−1)), and (spl_total(k−1)

and spl_total(k−2) decrease gently), determining that spl_total(k) decreases excessively rapidly, wherein k≥2, and it is preset that a total sound pressure level of the $0^{th}$ frame and a total sound pressure level of the $1^{st}$ frame decreases gently; or if neither of the foregoing two conditions is met, determining that spl_total(k) decreases gently, wherein $a_6$ is a preset sixth threshold.

* * * * *